United States Patent
Choi et al.

(10) Patent No.: US 8,026,787 B2
(45) Date of Patent: Sep. 27, 2011

(54) CERAMIC COMPONENT ELEMENT AND CERAMIC COMPONENT AND METHOD FOR THE SAME

(75) Inventors: Kwang-Hwi Choi, Ansan (KR); Seong-Soo Jo, Gunpo (KR); Sun-Ki Kim, Gunpo (KR)

(73) Assignee: Joinset Co., Ltd., Danwon-gu, Ansan, Kyeonggi-do (KR)

( * ) Notice: Subject to any disclaimer, the term of this patent is extended or adjusted under 35 U.S.C. 154(b) by 609 days.

(21) Appl. No.: 12/224,976

(22) PCT Filed: Feb. 15, 2007

(86) PCT No.: PCT/KR2007/000811
§ 371 (c)(1),
(2), (4) Date: Sep. 8, 2008

(87) PCT Pub. No.: WO2007/105865
PCT Pub. Date: Sep. 20, 2007

(65) Prior Publication Data
US 2009/0096569 A1 Apr. 16, 2009

(30) Foreign Application Priority Data

Mar. 10, 2006 (KR) .................. 10-2006-0022653
Jun. 23, 2006 (KR) .................. 10-2006-0057122

(51) Int. Cl.
*H01C 7/10* (2006.01)

(52) U.S. Cl. .............. 338/20; 338/21; 338/307; 29/612
(58) Field of Classification Search .................. 338/20, 338/21, 22 R, 307–309; 29/612, 623
See application file for complete search history.

(56) References Cited

U.S. PATENT DOCUMENTS

| 6,163,246 | A  | * | 12/2000 | Ueda et al. ............... 338/331 |
| 6,232,867 | B1 | * | 5/2001 | Yoshida et al. ............ 338/21 |
| 6,522,237 | B1 | * | 2/2003 | Ito et al. ................. 338/22 R |
| 7,075,404 | B2 | * | 7/2006 | Hirose et al. ............. 338/21 |

* cited by examiner

*Primary Examiner* — Kyung Lee
(74) *Attorney, Agent, or Firm* — Locke Lord Bissell & Liddell, LLP; Alan B. Clement; Peter J. Fallon

(57) ABSTRACT

A ceramic component element is provided. The ceramic component element includes: an insulating ceramic base with pores formed on its surface and previously fired; and a functional ceramic sheet bonded to the insulating ceramic base and having electrical characteristics. The functional ceramic sheet is physically bonded to the insulating ceramic base by forming pressing a green sheet for the functional ceramic sheet on the insulating ceramic base at constant temperature and pressure so that parts of the green sheet are forced to put into the pores and anchored, and the functional ceramic sheet is chemically bonded to the insulating ceramic base by firing the anchored green sheet in such a manner that functional oxides of the green sheet penetrate the insulating ceramic base by solid diffusion to form a diffusion bonding layer.

20 Claims, 11 Drawing Sheets

[Figure 1]
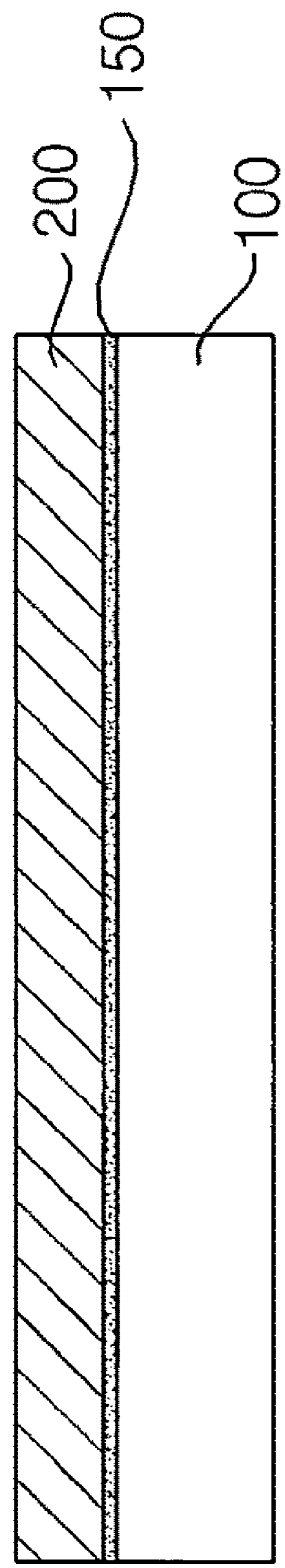

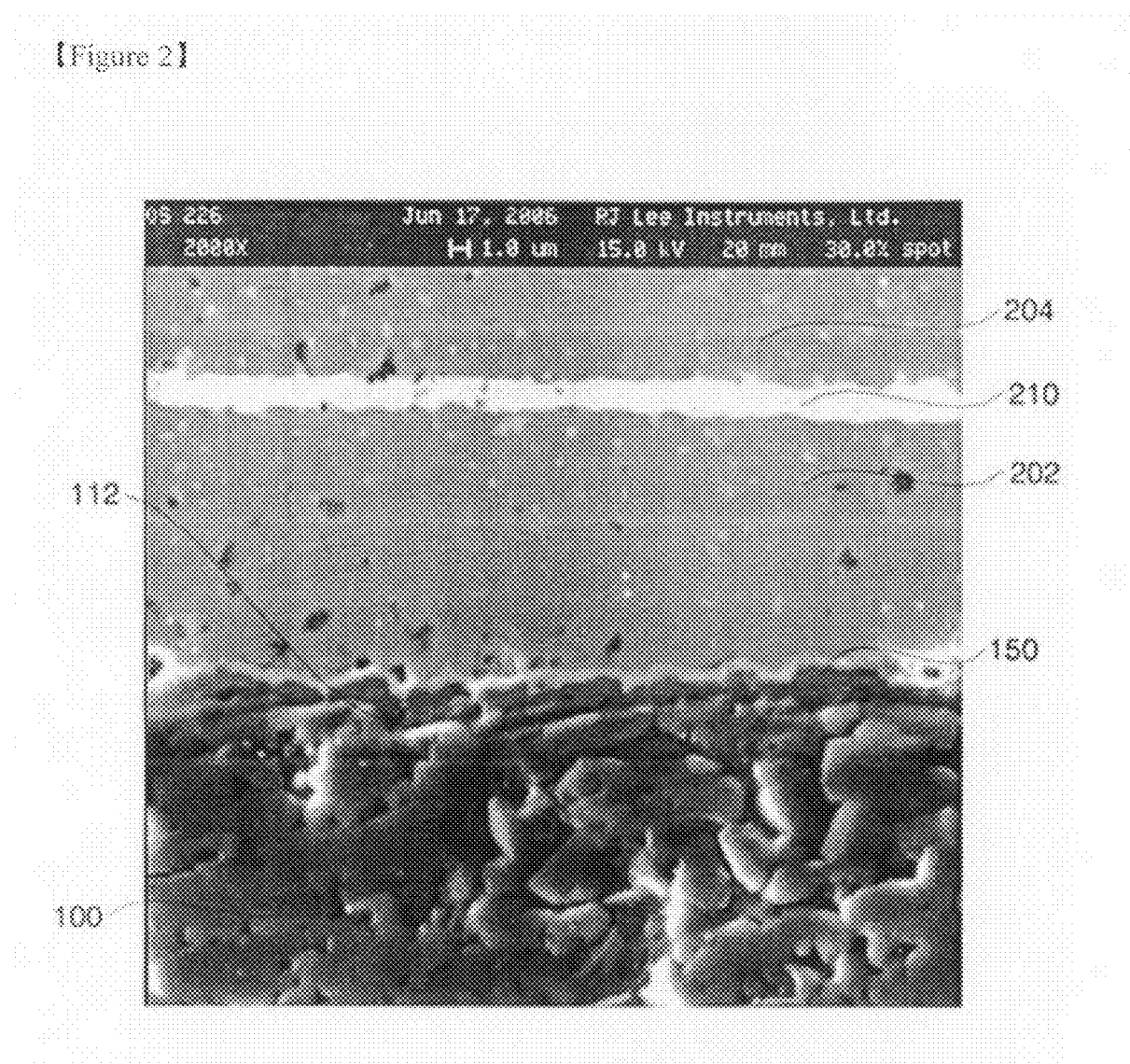

[Figure 3]
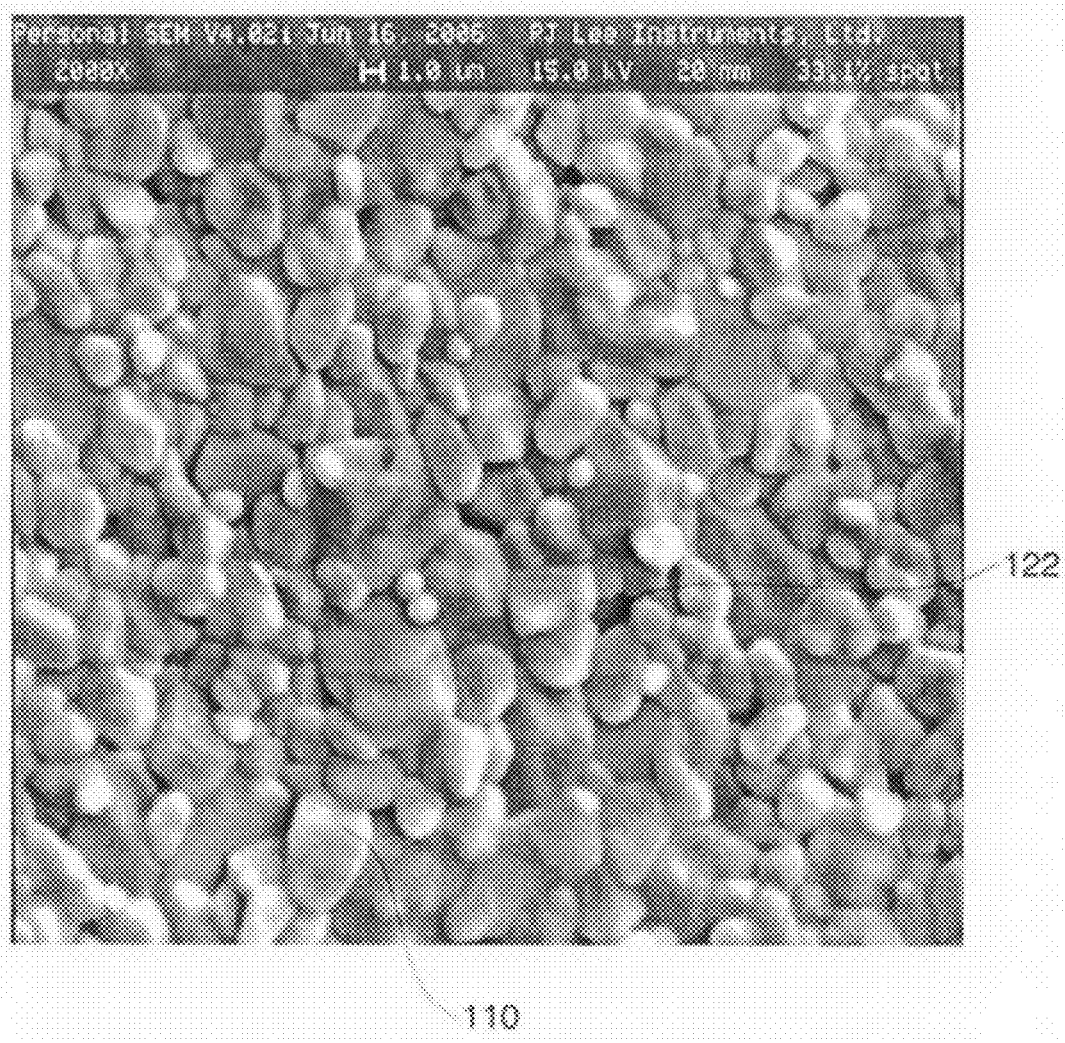

[Figure 4]
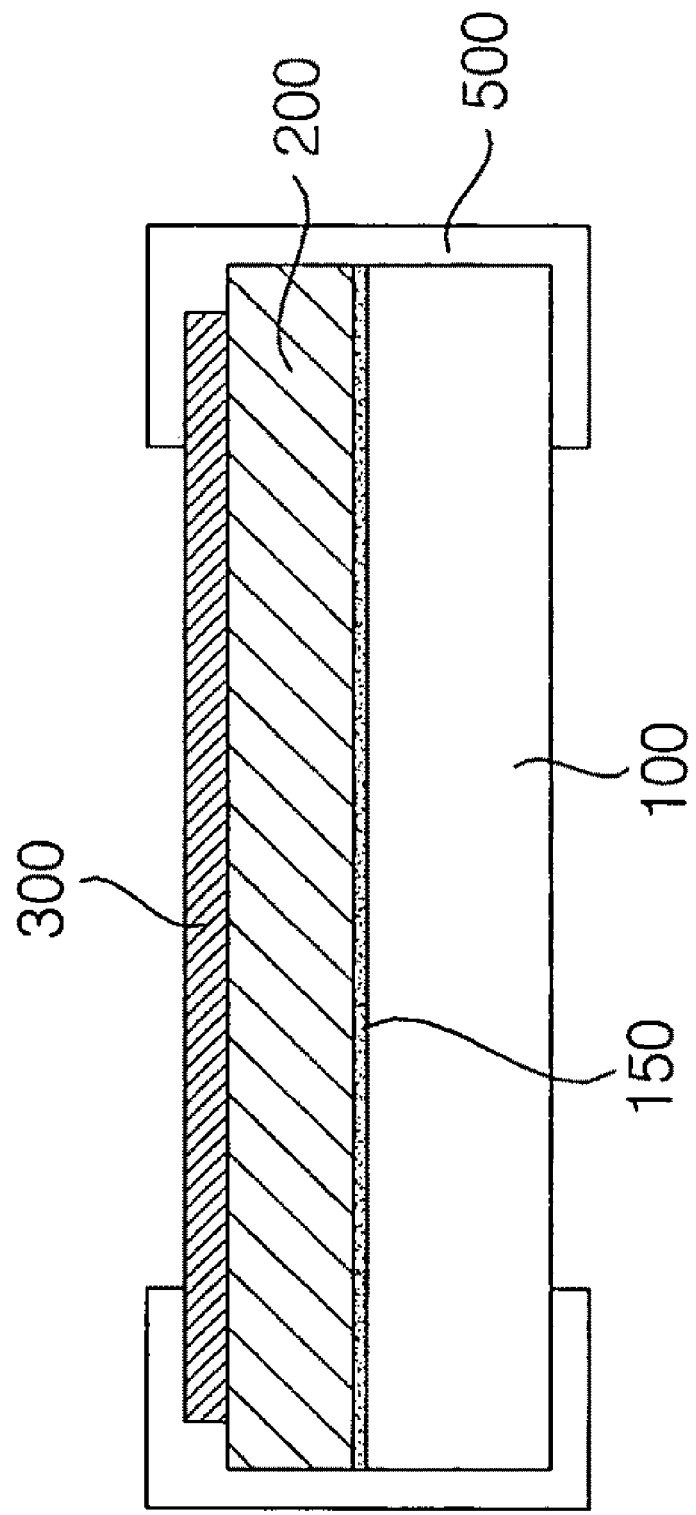

[Figure 5]
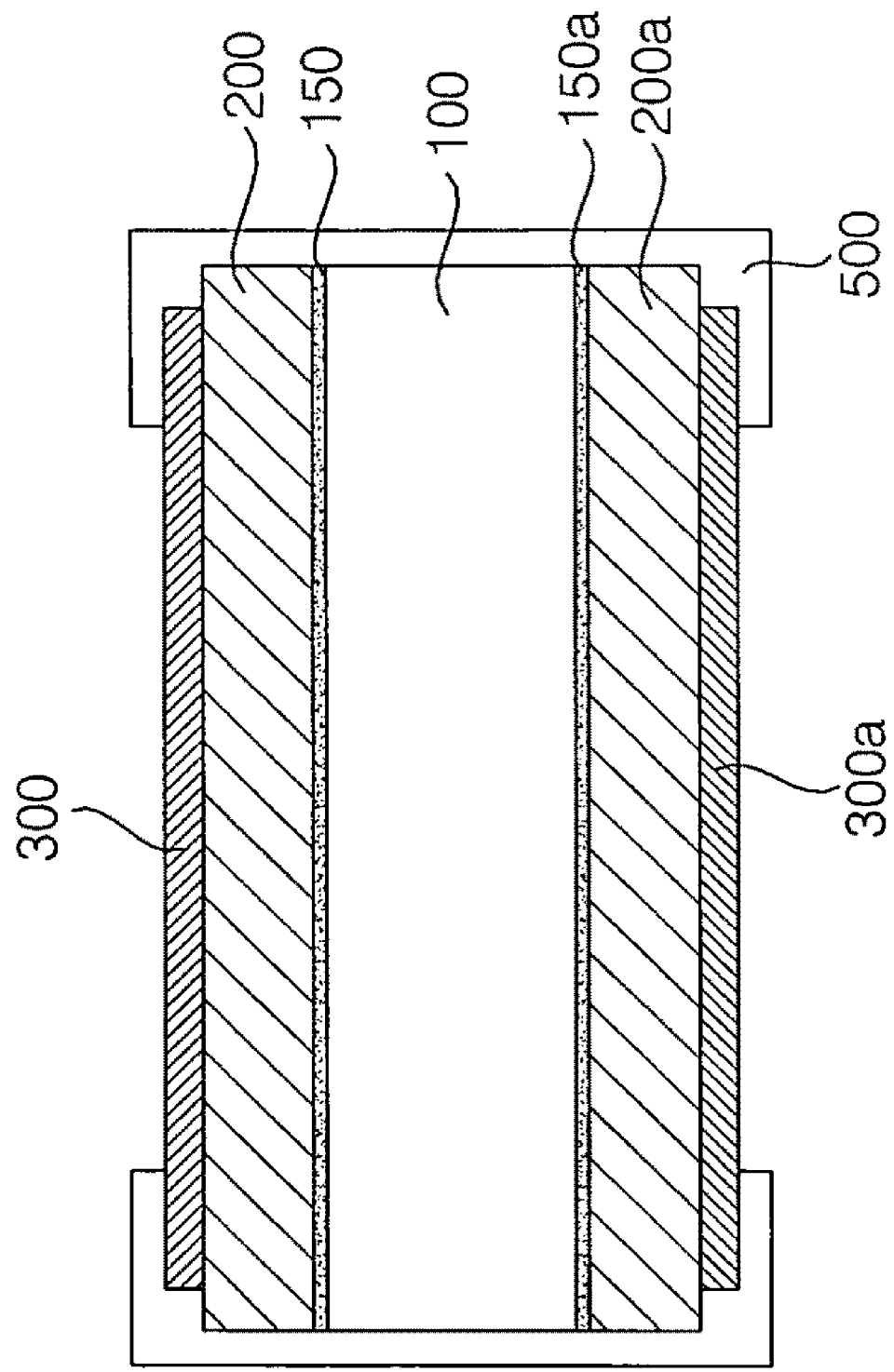

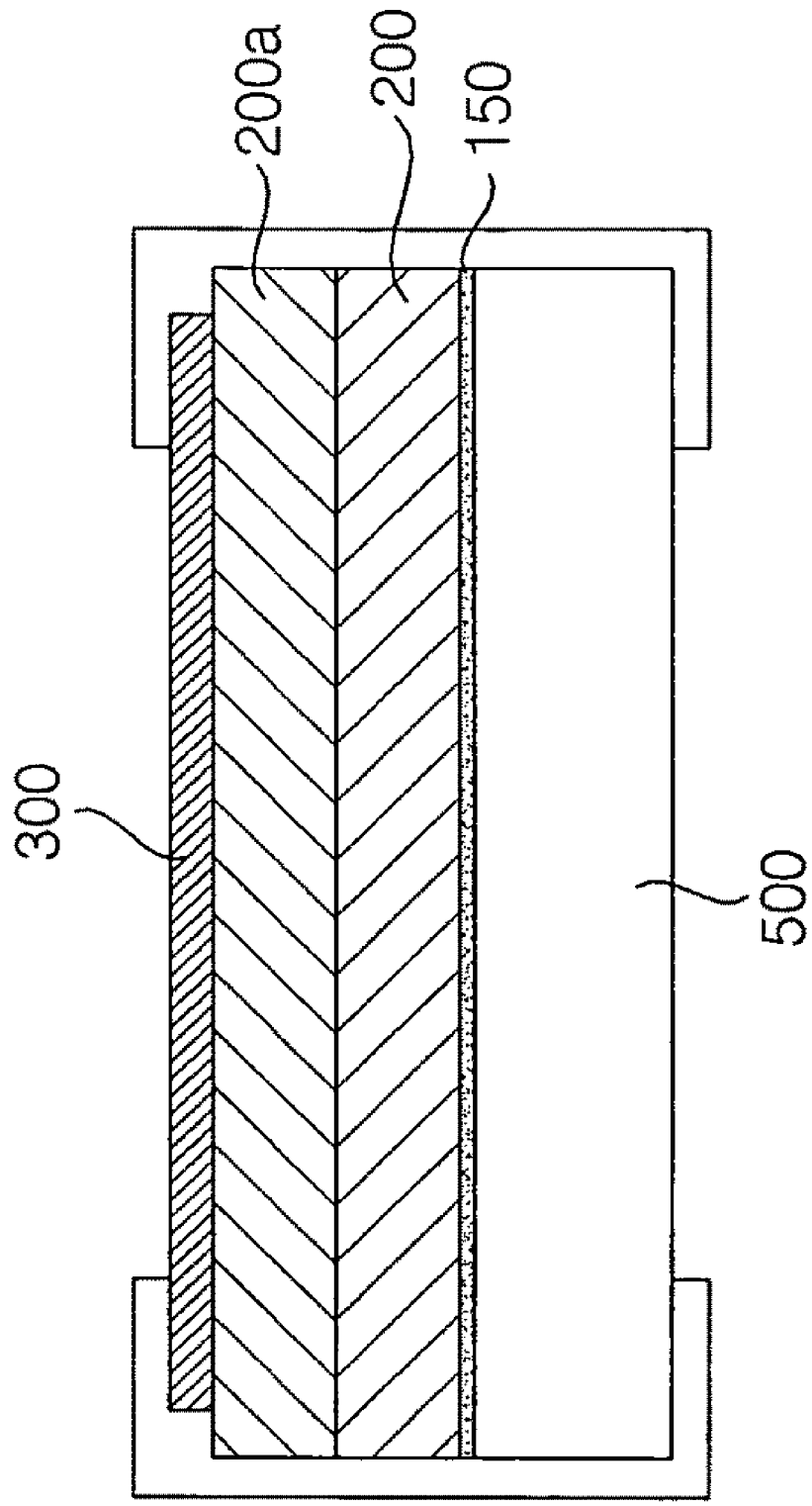
[Figure 6]

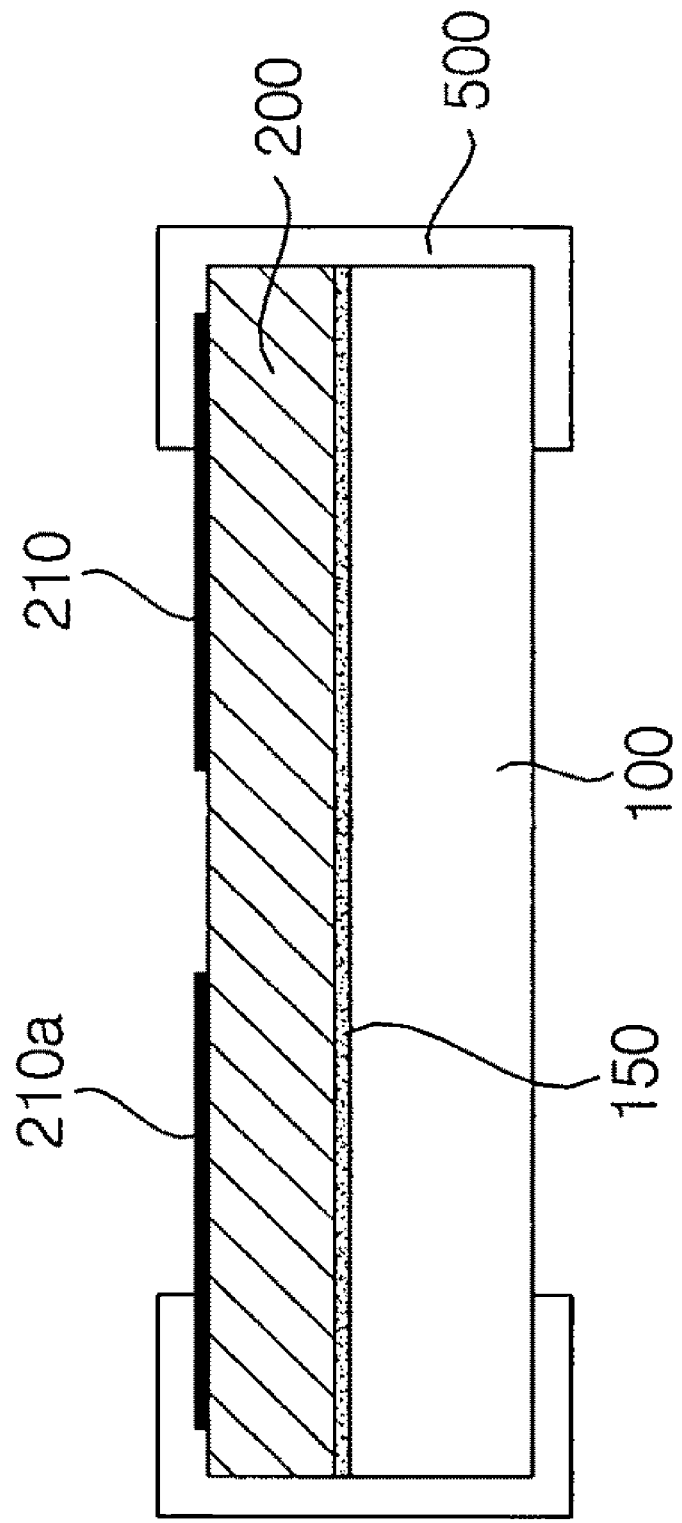
[Figure 7]

[Figure 8]
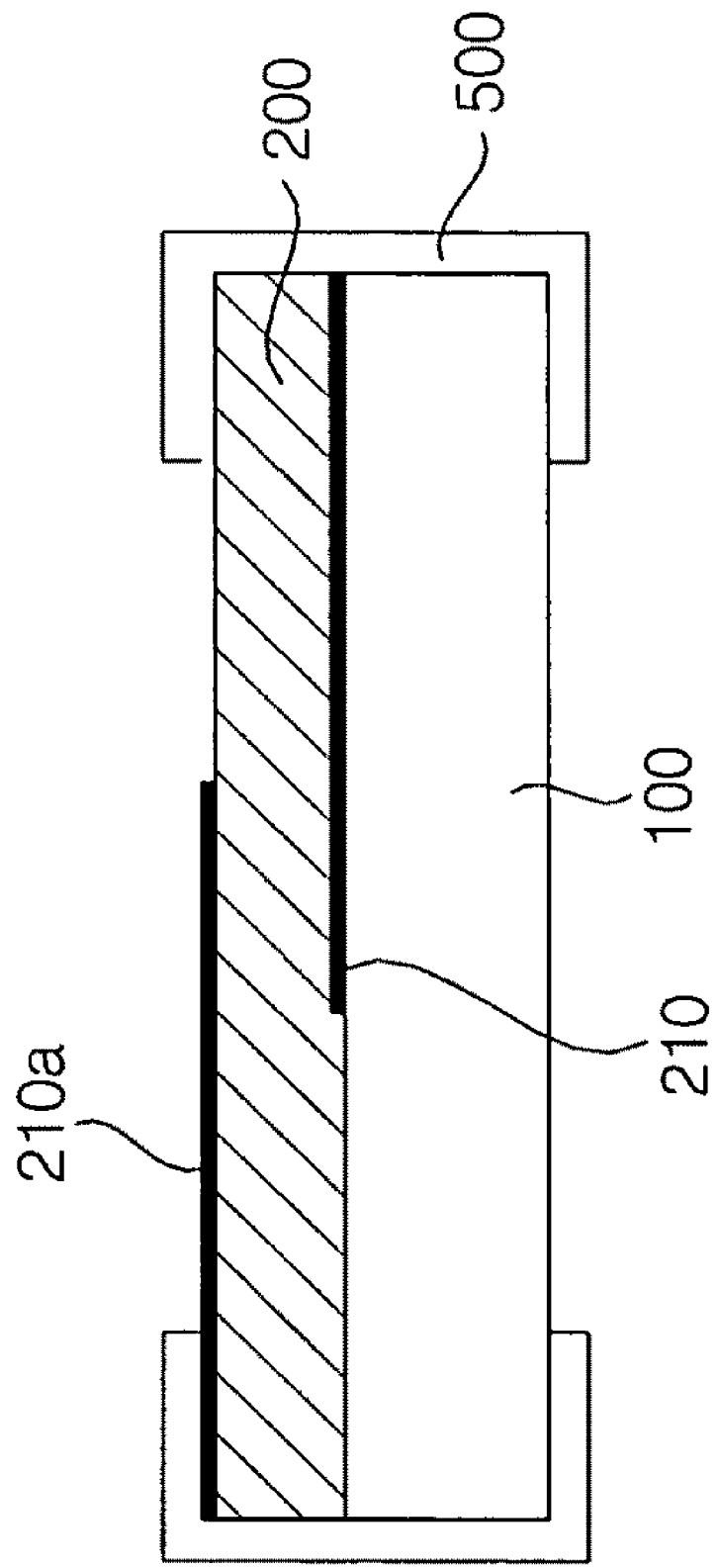

[Figure 9]
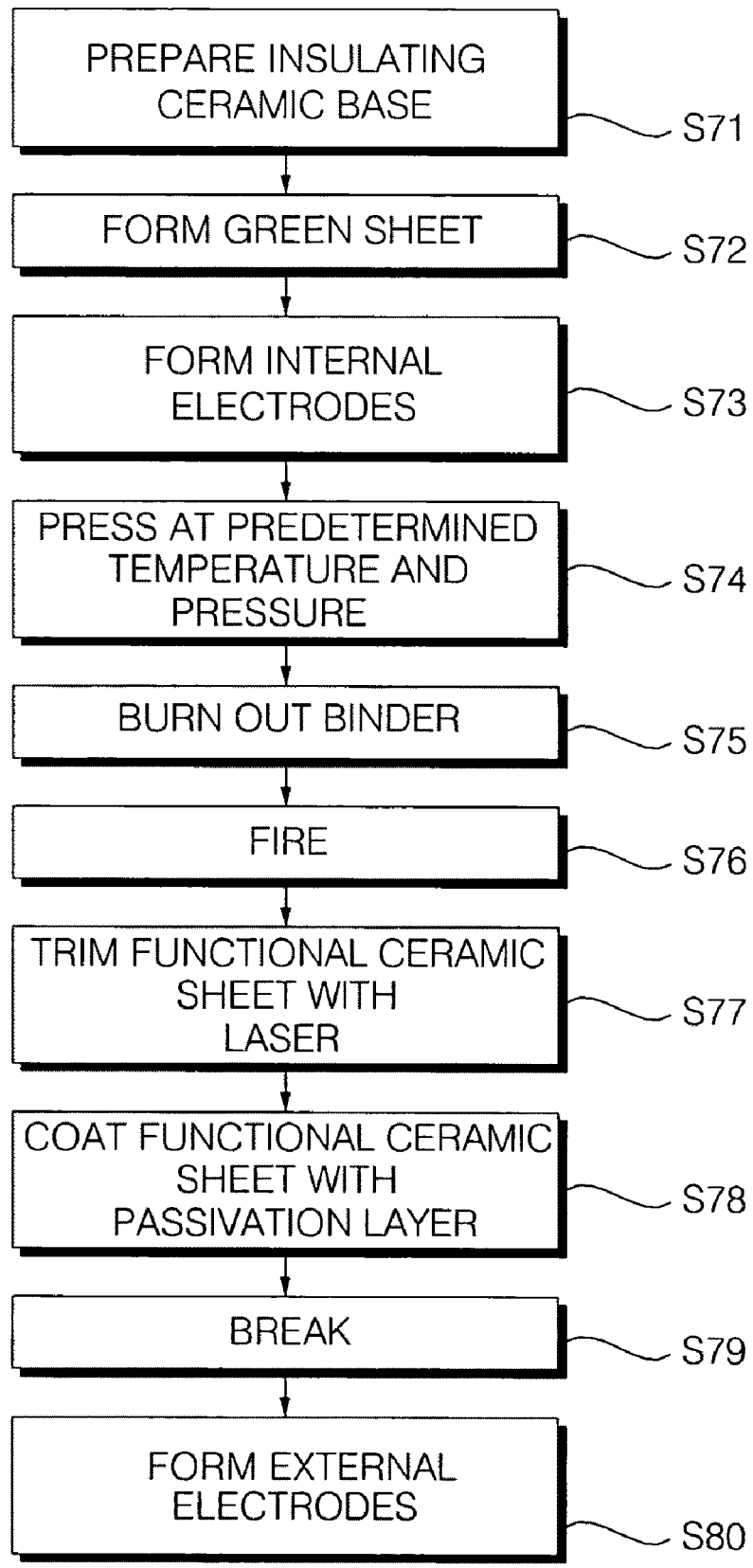

[Figure 10]
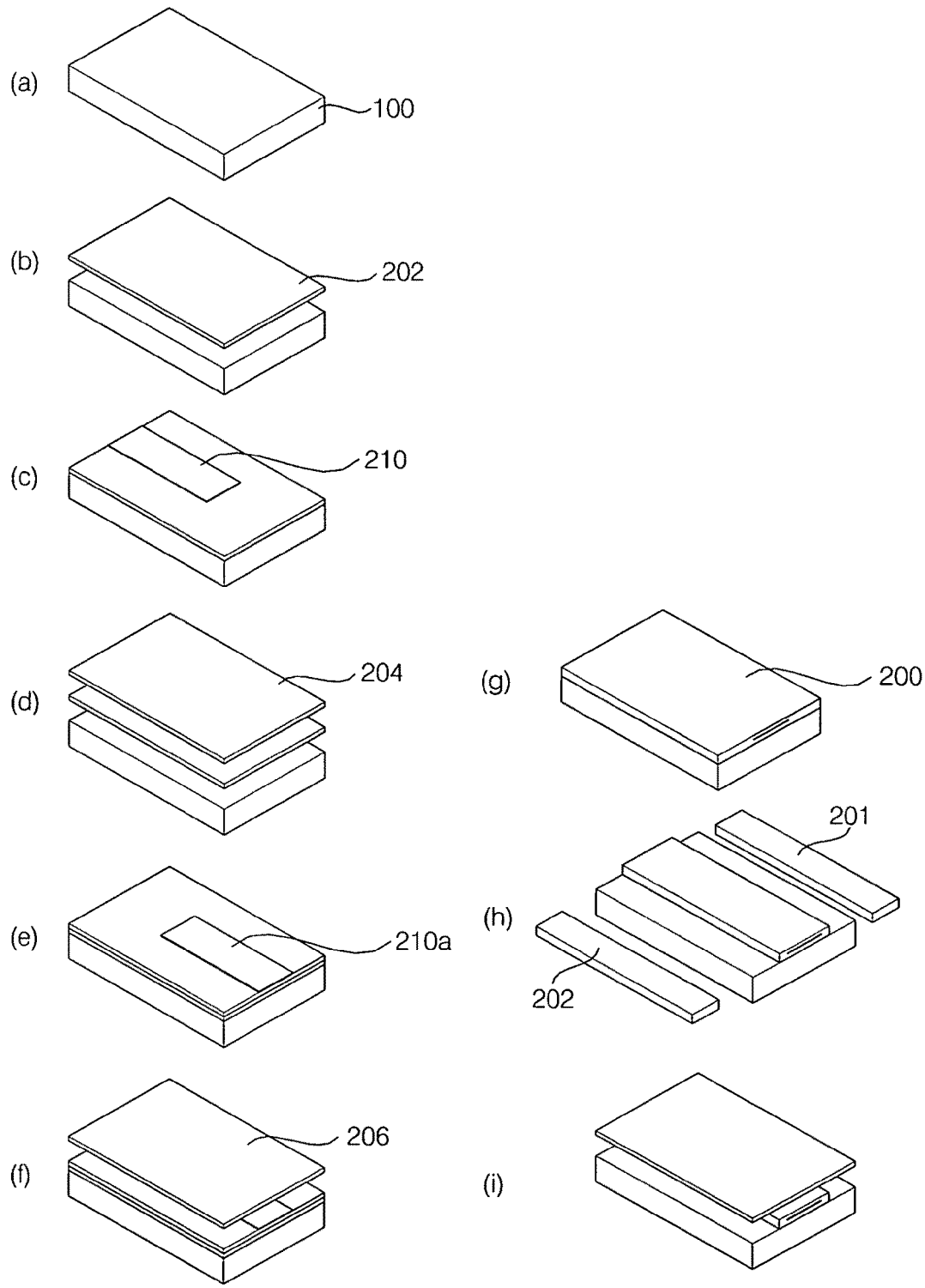

[Figure 11]
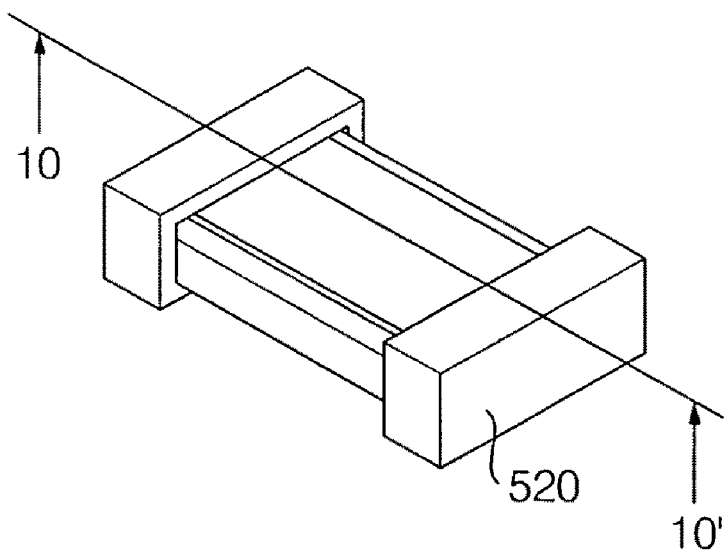
[Figure 12]
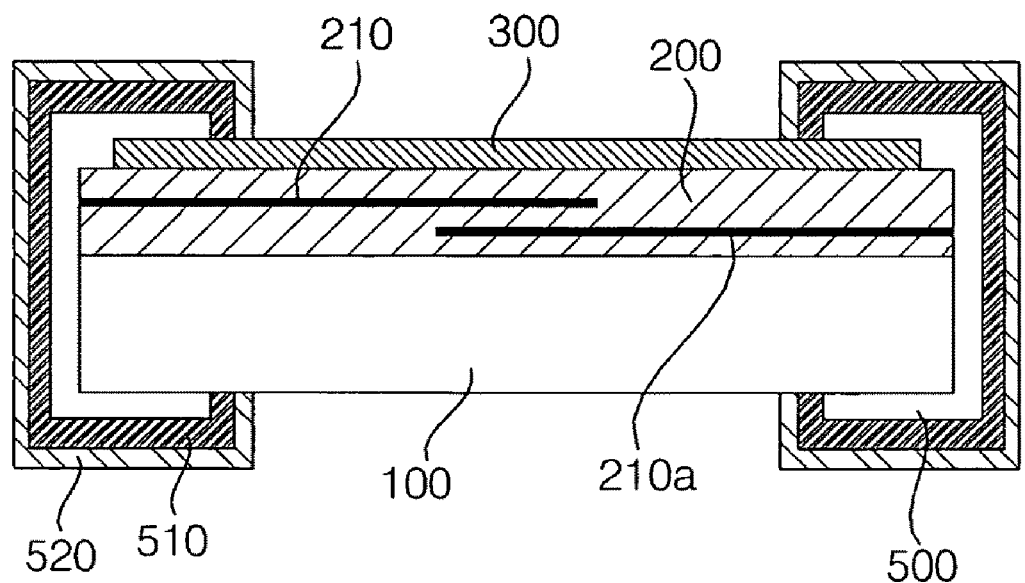

CERAMIC COMPONENT ELEMENT AND CERAMIC COMPONENT AND METHOD FOR THE SAME

TECHNICAL FIELD

The present invention relates to a ceramic component element, a ceramic component, and a method for manufacturing the same.

As electronic instruments have been required to have high functionality, more functional ceramic components have been used for the high integration of the electronic instruments. Examples of such functional ceramic elements include a chip varistor preventing malfunction of an electronic instrument by protecting a semiconductor element from electrostatic discharge or the like, and a chip thermistor varying in resistance when the surrounding temperature changes to inform an active element such as a micro computer of extreme temperature conditions.

BACKGROUND ART

Such conventional functional ceramic elements (e.g., chip thermistors manufactured by Murata company, Japan, and chip varistors manufactured by TDK) are manufactured through a traditional chip stacking process. In the chip stacking process, green sheets formed of a metal oxide and a binder material and internal electrodes providing electrical connection for the green sheets are sequentially stacked and printed. This operation is repeatedly performed, and then pressing and firing operations are performed on the stacked structure to increase the mechanical strength of the stacked structure and obtain required electrical characteristics.

Functional ceramic components manufactured by this chip stacking process include internal electrodes and a functional ceramic sheet formed of the green sheet converted by firing. The functional ceramic sheet includes an active layer electrically activated by the internal electrodes and cover layers formed on top and bottom surfaces of the active layer for protecting the active layer and increasing the mechanical strength of the functional ceramic sheet.

DISCLOSURE

Technical Problem

Since the functional ceramic component is manufactured using only the green sheet and internal electrodes through the above-described stacking process, the functional ceramic component has the following disadvantages.

(1) Since the green sheet is formed of an expensive metal oxide, a product is also expensive.

(2) Since the functional ceramic component is formed through a plurality of stacking operations of green sheets, the accumulated deviation for thicknesses of the stacked green sheets remains even after firing, and thus the thickness deviation of final products is large.

(3) Since the cover layers are usually thicker than the active layer formed between the cover layers, pressure is not sufficiently transferred to the active layer during a pressing process. Therefore, the thickness of the active layer becomes non-uniform and the characteristics of final products are deteriorated.

(4) Since the thickness of the cover layers should be sufficiently large in order to maintain the mechanical strength, the thickness of final products increases.

(5) It is difficult to manufacture multifunctional ceramic components by bonding different types of materials. This is because it is very difficult to find different types of functional ceramic materials having the same thermal expansion coefficient and firing temperature for making a desired multifunctional ceramic component.

(6) Since the active layer exhibiting electrical characteristics is covered with the cover layers, it is difficult to complement the characteristics of products and increase the yield rate by performing an additional process after the stacking process.

One example of the stacking process is a low-temperature co-firing ceramic (LTCC) process used for a chip ceramic inductor and a chip ceramic inductor module. However, the LTCC technology has the same disadvantages since only the green sheet and the internal electrodes are used.

Another method for manufacturing a functional ceramic component uses a conventional process for a chip resistor. In this method, functional ceramic paste is prepared by mixing functional ceramic powder with a binder, an emulsifier, etc, and then the functional ceramic paste is applied to an insulating ceramic base such as an alumina base by screen printing. After that, the functional ceramic paste is fired at a predetermined temperature. In a product manufactured by this method, the insulating ceramic base maintains the mechanical strength and dimensional stability of the product, and the paste layer functions as a functional ceramic sheet exhibiting electrical characteristics through the firing process. However, this thick film printing method employing the chip resistor manufacturing process has the following disadvantages since the functional ceramic sheet is formed through the printing method.

(1) Since the functional ceramic sheet is formed by screen printing, the thickness of the functional ceramic sheet is not uniform due to the non-uniformity of emulsion and spreading of a screen. Particularly, when the functional ceramic sheet has a large area, the thickness of the functional ceramic sheet has a large deviation increasing the degree of scattering of the electric characteristics of a final product.

(2) It is difficult to form a thick functional ceramic sheet by screen printing. That is, there is a limit for forming a functional ceramic sheet having desired electrical characteristics. Also, it is inconvenient and expensive to repeat the screen printing for forming a thick functional ceramic sheet.

(3) The electrical characteristics of the functional ceramic sheet are limited since the viscosity of the functional ceramic paste should be adjusted within a certain range for the screen printing.

(4) Since the functional ceramic sheet is formed by screen printing, drying, and firing, without pressing the green sheets, metal oxides of the functional ceramic sheet are not sufficiently densified, thereby deteriorating the electrical characteristics of a final product.

(5) After the firing process, the functional ceramic sheet is not stably bonded to the insulating ceramic base. Therefore, the functional ceramic sheet can be easily cracked or separated from the insulating ceramic base even by a slight thermal or mechanical shock.

(6) It is difficult to manufacture precise products due to the precision limit of the thick film printing process.

Due to the above-described disadvantages, components manufactured by the screen printing method are used only for chip resistor products.

Examples of functional ceramic components manufactured using the green sheet stacking process and the printing process include chip thermistors (NT73 series) manufactured by KOA company, Japan and chip thermistors manufactured by VISHAY company, Germany. These functional ceramic components are manufactured by the printing process applying a chip resistor manufacturing method in order to reduce the price of the functional ceramic components. However, owing to the above-described disadvantages of the printing method, material selection is limited and it is difficult to manufacture high-precision products (±1%). Thus, those companies are trying to obviate these problems.

In another method of the related art, an additional adhesive is used for manufacturing ceramic components. In detail, the insulating ceramic base and the functional ceramic sheet are prepared through separate firing processes, and the functional ceramic sheet is bonded to the insulating ceramic base using an additional adhesive. However, this method complicates the manufacturing process and increases the manufacturing costs owing to the use of the additional adhesive. Furthermore, it is difficult to manufacture small-sized products.

In a further another method of the related art, a thin functional ceramic component is manufactured by forming a functional ceramic target on an insulating ceramic base through vacuum deposition, plasma coating, or thermal spray, like in a semiconductor manufacturing process. However, this method requires expensive equipment such as a vacuum chamber. Furthermore, it is very difficult to develop an electrically functional material suitable for this method. In addition, although the functional ceramic sheet can be easily formed to a very thin thickness, it is difficult to form the functional ceramic sheet to a somewhat thick thickness, thereby limiting electrical characteristics of the ceramic component.

An antistatic component proposed by Matsushita electric industrial is disclosed in Japanese Laid-open Patent Publication 2005-294673. The antistatic component includes a substrate and a varistor layer formed on the substrate. The varistor layer is formed of a material containing at least bismuth oxide. The bismuth oxide is diffused into the substrate by sintering the varistor layer and the substrate to form a bismuth oxide diffusion layer in the substrate.

However, in the above-described method, just forming of a diffusion layer cannot make coupling of a varistor layer and an alumina substrate reliable during mass production of components. That is, since a method of providing only the diffusion layer has the following disadvantages, the method is difficult to manufacture products having electrical and mechanical reliability.

(1) With a simple stacking process, a green sheet cannot be bonded to a surface of an alumina substrate uniformly and reliably. For this reason, the following two problems may occur during binder burn-out (a process for removing organic solvent) and firing processes.

In other words, firing shrinkage occurs in X, Y and Z axis directions in a green sheet formed on an alumina substrate during a firing process, but a bonding strength between the alumina substrate and the green sheet is not large enough to control the firing shrinkage. Thus, the varistor layer may be completely separated from the alumina substrate.

Although the varistor layer is not completely separated from the alumina substrate, the varistor layer may partially come off the alumina substrate. This causes the varistor layer to crack or break during a process of dividing the alumina substrate including the varistor layer into single chips, thereby deteriorating physical, electrical, and mechanical characteristics of a final product.

(2) The bismuth oxide contained in the varistor layer is a glass additive having a melting point of 825° C. The varistor composition containing a glass additive of a low melting point is fired below 1000° C. in order to prevent the deterioration of electrical characteristic of the varistor layer due to a complete melting of the bismuth oxide.

Therefore, when the varistor layer containing bismuth oxide and the alumina substrate are fired below 1000° C., it can be understood that the bonding is a glass bonding due to the melting of the bismuth oxide, and thus the bonding region is susceptible to thermal shock and is difficult to have a reliable electrical characteristic.

Technical Solution

An object of the present invention is to provide a ceramic component element, a ceramic component, and a method of manufacturing the same.

Another object of the present invention is to provide a ceramic component that can be manufactured with greatly reduced cost.

Another object of the present invention is to provide a light and slim ceramic component having a sufficient mechanical strength.

Another object of the present invention is to provide a reliable ceramic component having good electrical characteristics by forming a functional ceramic sheet that has a uniform thickness and is maintained at a high density through a densifying process.

Another object of the present invention is to provide a ceramic component in which a functional ceramic sheet is reliably bonded to an insulating ceramic base without using an additional adhesive.

Another object of the present invention is to provide a ceramic component in which a functional ceramic sheet can be easily formed to a desired thickness.

Another object of the present invention is to provide a ceramic component that has various electrical characteristics by combining green sheets having various functional oxides.

Another object of the present invention is to provide a ceramic component of which the yield rate is improved by decreasing the degree of scattering of the electric characteristics of products.

Another object of the present invention is to provide a ceramic component that can be easily formed to a desired thickness by bonding a proper combination of various green sheets for forming a functional ceramic sheet to an insulating ceramic base.

Another object of the present invention is to provide a ceramic component that can realize a multifunction by bonding different types of functional ceramic sheets to an insulating ceramic base.

Another object of the present invention is to provide a ceramic component that has characteristics easily adjustable by controlling characteristics of a final product by adding an additional process such as a laser trimming to a manufacturing process of the ceramic component, thereby improving the yield rate.

ADVANTAGEOUS EFFECTS

As described above, the present invention has various advantages as follows.

An insulating ceramic base is previously prepared by firing, and a green sheet(s) is physically bonded to the insulating ceramic base through isothermal, isobaric pressing. Then, the green sheet is converted into a functional ceramic sheet by firing, and at the same time, the diffusion bonding layer is formed between the insulating ceramic base and the functional ceramic sheet since metal oxides transfer from the functional ceramic sheet into the insulating ceramic base by solid diffusion. The diffusion bonding layer increases the bonding strength between the insulating ceramic base and the functional ceramic sheet, and thus a reliable functional ceramic component can be manufactured without cracks or bending.

Also, since the functional ceramic sheet has a smaller thickness when compared with the conventional functional ceramic sheet, expensive metal oxides for the functional ceramic sheet can be saved, and thus the manufacturing costs of the ceramic component can be reduced.

Furthermore, since the insulating ceramic base is previously prepared through a high-temperature firing, the ceramic component can have a sufficient mechanical strength though the functional ceramic sheet is thin. Therefore, thin, light, and strong ceramic components can be manufactured.

Moreover, since the functional ceramic sheet has a uniform thickness and high density, the degree of scattering of electric characteristics and thickness of products can be improved, thereby increasing the yield rate.

In addition, since difference type of functional ceramic sheets can be formed on an insulating ceramic base, a multi-functional ceramic component can be manufactured.

DESCRIPTION OF DRAWINGS

The above objects and other advantages of the present invention will become more apparent by describing in detail preferred embodiments thereof with reference to the attached drawings in which:

FIG. 1 is a schematic sectional view of a ceramic component element according to the present invention;

FIG. 2 is a photographic image showing a section of an insulating ceramic base and a functional ceramic sheet bonded to the insulating ceramic base;

FIG. 3 is a photographic image showing a surface of the insulating ceramic base;

FIGS. 4 to 8 are sectional views illustrating an exemplary ceramic component with the ceramic component element of FIG. 1;

FIG. 9 is a flowchart illustrating a method of manufacturing a ceramic component according to the present invention;

FIGS. 10A to 10I are views illustrating the method of FIG. 9;

FIG. 11 is a perspective view of a ceramic component manufactured through the method of FIG. 9; and FIG. 12 is a sectional view taken along a line 10-10' of FIG. 11.

BEST MODE

According to an aspect of the present invention, there is provided a ceramic component element including: an insulating ceramic base with pores formed on its surface and previously fired; and a functional ceramic sheet bonded to the insulating ceramic base and having electrical characteristics. The functional ceramic sheet is physically bonded to the insulating ceramic base by forming and pressing a green sheet for the functional ceramic sheet on the insulating ceramic base at constant temperature and pressure so that parts of the green sheet are forced to put into the pores and anchored, and the functional ceramic sheet is chemically bonded to the insulating ceramic base by firing the anchored green sheet in such a manner that functional oxides of the green sheet penetrate the insulating ceramic base by solid diffusion to form a diffusion bonding layer.

With the above configuration, the high reliability can be realized by providing both physical bonding owing to anchoring and chemical bonding owing to the diffusion layer.

The green sheet may include 40% to 80% by weight of solid functional oxides and 5% to 30% by weight of solid binder.

The functional ceramic sheet may have a thickness smaller than half the thickness of the insulating ceramic base.

The insulating ceramic base may be surface treated by polishing, forming a plurality of grooves, or etching to increase a bonding strength between the insulating ceramic base and the functional ceramic sheet.

The functional ceramic sheet may include any one of characteristics of a dielectric ceramic material, a piezoelectric ceramic material, a magnetic ceramic material, and a semiconductor ceramic material.

The insulating ceramic base may be any one of silicon, alumina, and aluminum nitride based insulating ceramic bases.

A ceramic component may be formed by including two or more electrodes electrically connected with the functional ceramic sheet.

A ceramic component may be formed by further including: an internal electrode bonded to the functional ceramic sheet in electric connection with the functional ceramic sheet; and an external electrode electrically connected with an exposed portion of the internal electrode.

The internal electrode may be bonded to a surface of the functional ceramic sheet, and the ceramic component may further include an auxiliary functional ceramic sheet bonded to the functional ceramic sheet to cover the internal electrode and having the same electrical characteristics as the functional ceramic sheet.

The functional ceramic sheet may have a stacked structure formed of a plurality of sheets.

The internal electrode may be formed of a material selected from the group consisting of Ag, Pd, Pt, Au, Ni, Cu, W, and Ag—Pd alloy.

According to another aspect of the present invention, there is provided a ceramic component element including: an insulating ceramic base with pores formed on its surface and previously fired; a first functional ceramic sheet bonded to a top surface of the insulating ceramic base and having electrical characteristics; and a second functional ceramic sheet bonded to a bottom surface of the insulating ceramic base and having electrical characteristics different from those of the first functional ceramic sheet. The first and second functional ceramic sheets are physically bonded to the top and bottom surfaces of the insulating ceramic base by forming and pressing green sheets for the first and second functional ceramic sheets on the insulating ceramic base at constant temperature and pressure so that parts of the green sheets are forced to put into the pores and anchored, and the first and second functional ceramic sheets are chemically bonded to the top and bottom surfaces of the insulating ceramic base by firing the anchored green sheets in such a manner that functional oxides of the green sheets penetrate the insulating ceramic base by solid diffusion to form diffusion bonding layers. A via hole may be formed such that it penetrates the top and bottom surfaces of the insulating ceramic base and an electrode may be formed in the via hole for electrically connecting the first and second functional ceramic sheets.

According to further another aspect of the present invention, there is provided a ceramic component element including: an insulating ceramic base with pores formed on its surface and previously fired; a first functional ceramic sheet bonded to the insulating ceramic base and having electrical characteristics; and a second functional ceramic sheet bonded to the first functional ceramic sheet and having electrical characteristics different from those of the first functional ceramic sheet. The first functional ceramic sheet is physically bonded to the insulating ceramic base by forming pressing a green sheet for the first functional ceramic sheet on the insulating ceramic base at constant temperature and pressure so that parts of the green sheet are forced to put into the pores and anchored, and the first functional ceramic sheet is chemically bonded to the insulating ceramic base by firing the anchored green sheet in such a manner that functional oxides of the green sheet penetrate the insulating ceramic base by solid diffusion to form a diffusion bonding layer.

According to still another aspect of the present invention, there is provided a method of manufacturing a ceramic component element, the method including: forming a green sheet on an insulating ceramic base with pores formed on its surface and previously fired; pressing the green sheet against the insulating ceramic base so that a part of the green sheet is forced to put into the pores and is anchored and is physically bonded to the insulating ceramic base; removing a binder from the green sheet; firing the green sheet under a predetermined condition; and converting the green sheet into a functional ceramic sheet having electrical characteristics through the firing, and at the same time chemically bonding the functional ceramic sheet to the insulating ceramic base by a diffusion bonding layer formed by solid diffusion and penetration of functional oxides from the green sheet into the insulating ceramic base during the firing of the green sheet.

The firing of the green sheet may be performed at a temperature lower than a firing temperature of the insulating ceramic base by a predetermined value.

A ceramic component may be manufactured by further including an external electrode electrically connected with the functional ceramic sheet.

The green sheet may be formed on a top surface of the insulating ceramic base, the method further including forming an internal electrode on the top surface of the insulating surface, a top surface of the green sheet, or each of top and bottom surfaces of the green sheet, wherein the external electrode is electrically connected with the internal electrode.

The method may further include: trimming the functional ceramic sheet with laser to expose a surface of the insulating ceramic base, the trimmed functional ceramic sheet being wider than the internal electrode; and forming a passivation layer bonded to the exposed surface of insulating ceramic base and covering the internal electrode.

MODE FOR INVENTION

Now, preferred embodiments of the present invention will be described in detail with reference to the accompanying drawings. In the drawings, the dimension and shape of elements may be changed to emphasize features of the present invention.

FIG. 1 is a schematic sectional view of a ceramic component element according to the present invention, FIG. 2 is a photographic image showing a section of an insulating ceramic base and a functional ceramic sheet bonded to the insulating ceramic base, and FIG. 3 is a photographic image showing a surface of the insulating ceramic base.

Referring to FIG. 1, the ceramic component element according to the present invention includes an insulating ceramic base 100 formed by firing and a functional ceramic sheet 200 bonded to a top surface of the insulating ceramic base 100 and having an electrical characteristics.

The functional ceramic sheet 200 is bonded to the insulating ceramic base 100 through a diffusion bonding layer 150. When the functional ceramic sheet 200 is formed by firing a functional green sheet, functional oxides of the green sheet permeate into the insulating ceramic base 100 through solid diffusion, forming the diffusion bonding layer 150.

Referring to FIGS. 2 and 3, the surface of the insulating ceramic base 100 is made up of a plurality of grains 110 having different sizes (i.e., the insulating ceramic base 100 has a polycrystalline structure). Pores are formed in the grains 110 or between the grains 110 (reference numeral 112 denotes pores formed in the grains 110 and reference numeral 122 denotes pores between the grains 110). The pores 112 and 122 are related with the surface roughness of the insulating ceramic base 100, and affect anchoring of the functional ceramic sheet 200 (described later). Also, the pores 112 and 122 serve as paths for material transferring through solid diffusion during a firing process (described later).

According to the present invention, a green sheet is formed on the insulating ceramic base 100 and tightly abutted against the insulating ceramic base 100 by pressing it at constant temperature and pressure. Then, the green sheet is fired through a binder burn-out process to convert the green sheet into the functional ceramic sheet 200. At the same time, as materials of the functional ceramic sheet 200 are forced to put into the insulating ceramic base 100 by solid diffusion, the diffusion bonding layer 150 is chemically formed between the insulating ceramic base 100 and the functional ceramic sheet 200.

Although it is difficult to determine the phase shape of the diffusion bonding layer 150 by current scientific analysis, the diffusion bonding layer 150 is formed of an intermediate material between materials of the functional ceramic sheet 200 and the insulating ceramic base 100. The properties of the diffusion bonding layer 150, such as volume, electrical characteristics, and phase state, can vary depending on the firing temperature, time, pressure, etc. However, once the diffusion bonding layer 150 is completely formed, the properties of the diffusion bonding layer 150 do not vary.

The insulating ceramic base 100 may be formed of previously fired polycrystalline alumina or aluminum nitride. The insulating ceramic base 100 is fired at a temperature higher than a firing temperature of the functional green sheet for the functional ceramic sheet 200 by at least 200° C. Otherwise, the insulating ceramic base 100 may bend when the green sheet is fired for forming the functional ceramic sheet 200. Also, the insulating ceramic base 100 may maintain an insulation resistance of $10^9$ ohm or greater at the temperature from −55° C. to 300° C., the usual temperature range for use of ceramic components.

Conversion of the green sheet into the functional ceramic sheet will now be more fully described.

The term "green sheet" is used to collectively denote film type sheets having a thickness of about several to several tens of micrometers, which are formed by mixing powders containing functional metal oxides having a predetermined material ratio with an additive, a diluent, and a binder to make a liquid slurry, and by evaporating volatile matters such as the diluent and the additive from the liquid slurry through a tape casting process (a hot-air drying process). The green sheet is soft and easy to tear, like paper.

In forming the green sheet, 90 percents or more of the binder are removed during a binder burn-out process, and then the remaining 10 percents are removed during a firing process. During the firing process, the functional metal oxides of the green sheet are densified by chemical reaction, thereby forming a functional ceramic sheet having desired mechanical and electrical characteristics.

This densification mechanism uses heat received during the firing process as a driving force and operates as follows. Particles of the metal oxides form necks→materials transfer into pores between the particles→the pores decrease→grains and grain boundaries are formed→grains grow (coarsening). The densification during the firing process proceeds in a direction of minimizing Gibb's free energy. The Gibb's free energy decreases in reverse proportion to the initial size of the metal oxide particles. That is, the smaller the initial size of the metal oxide particles is, the more rapidly the densification proceeds, at the same temperature.

Next, anchoring of the green sheet will be described.

When the insulating ceramic base 100 is formed of polycrystalline alumina or aluminum nitride, the pores 112 of the insulating ceramic base 100 may have a size of less than 1 μm, and the pores 122 of the insulating ceramic base 100 may have a size in the range of 1 μm to 3 μm. Since the pores 112 formed in the grains 110 are relatively small, the green sheet is difficult to be pushed into the pores 112 when pressing the green sheet against the insulating ceramic base 100. On the other hand, since the pores 122 formed between the grains 110 are relatively large, the green sheet can be pushed into the pores 122 by pressing, thereby increasing physical bonding strength between the insulating ceramic base 100 and the green sheet.

When the insulating ceramic base 100 has an extremely plain surface and the green sheet is pressed against the insulating ceramic base 100 for bonding, the bonding strength between the insulating ceramic base 100 and the green sheet depends on the binder of the green sheet. However, when the surface of the insulating ceramic base 100 is somewhat rough owing to the pores 122 formed between the grains 110, the green sheet is pushed into the pores 122 by pressing. Therefore, the green sheet can be more firmly bonded to the insulating ceramic base 100 owing to this anchoring structure as well as the bonding force by the binder of the green sheet. This anchoring structure prevents the green sheet from shrinking in a length (x-axis) direction and in a width (y-axis) direction. In addition, this anchoring effect increases an area of the diffusion bonding layer 150 formed between the insulating ceramic base 100 and the functional ceramic sheet 200, thereby increasing chemical bonding strength between the insulating ceramic base 100 and the functional ceramic sheet 200.

The anchoring effect may be improved by the following method. In detail, the insulating ceramic base 100 may be surface treated. For example, the surface of the insulating ceramic base 100 may be polished to increase surface roughness, or grooves may be formed to a predetermined length at predetermined intervals in the surface of the insulating ceramic base 100. Alternatively, the insulating ceramic base 100 may be chemically etched using acid or plasma to enlarge the pores 112 and 122.

As described above, the functional ceramic sheet 200 is firmly bonded to the insulating ceramic base 100 by the binder of the functional ceramic sheet 200 (physical bonding), the diffusion bonding layer 150 (chemical bonding), and the anchoring structure. In addition, an intermediate material can be used to increase the bonding strength between the functional ceramic sheet 200 and the insulating ceramic base 100. A single metal oxide or a composition of several metal oxides can be used as the intermediate material. The intermediate material is properly selected such that it can transfer into both the insulating ceramic base 100 and the functional ceramic sheet 200 by solid diffusion to form diffusion bonding layers. The intermediate material is prepared in the form of a green sheet and disposed between the insulating ceramic base 100 and another green sheet for the functional ceramic sheet 200. After that, the intermediate material is fired together with the green sheet for the functional ceramic sheet 200. Therefore, when the intermediate material is selected, the thermal expansion coefficient and firing conditions of the intermediate material should be considered in comparison with those of the insulating ceramic base 100 and the green sheet for the functional ceramic sheet 200. Also, the diffusion bonding layers, formed between the functional ceramic sheet 200 and the intermediate material and between the insulating ceramic base 100 and the intermediate material, should provide insulation as well as chemical bonding strength.

The firing conditions of the green sheet for the functional ceramic sheet 200 are properly selected to prevent deteriorating the characteristics of the functional ceramic sheet 200. For example, (Pr based) ceramic materials for varistor may be fired in the temperature range from 1100 to 1250° C. for 1 to 3 hours in the atmosphere. Also, depending on the composition ratio, ($BaTiO_3$ based) ceramic materials for PTC thermistors and capacitors may be fired in the temperature range from 950 to 1350° C. for 0.1 to 3 hours in atmosphere or a reducing atmosphere.

The green sheet formed on the insulating ceramic base 100 may include a dielectric ceramic material, a magnetic ceramic material, a piezoelectric ceramic material, or a semiconductor ceramic material depending on the type of a final product. Further, the insulating ceramic base 100 may be previously prepared by firing the green sheet according to the ceramic material included in the green sheet.

When the functional ceramic sheet 200 is required to have a high-frequency characteristic, it is preferable that the insulating ceramic base 100 has a dielectric constant of 30 or less. On the other hand, when the frequency characteristic of the functional ceramic sheet 200 is not important, the dielectric constant of the insulating ceramic base 100 is not limited.

In a few words, the insulating ceramic base 100 is previously prepared by firing, and the green sheet is pressed on the insulating ceramic base 100. Next, the green sheet is converted into the functional ceramic sheet 200 through binder burn-out and firing processes. During these processes, functional oxide materials transfer from the green sheet into the insulating ceramic base 100 by solid diffusion, thereby forming the diffusion bonding layer 150. Owing to the diffusion bonding layer 150, the functional ceramic sheet 200 can be reliably bonded to the insulating ceramic base 100.

FIGS. 4 to 8 are sectional views illustrating an exemplary ceramic component with the ceramic component element of FIG. 1.

Referring to FIG. 4, an insulating ceramic base 100 and a functional ceramic sheet 200 are bonded to each other with a diffusion bonding layer 150 formed therebetween. Electrodes 500 are formed on outer sides of the bonded structure in electric connection with the functional ceramic sheet 200. Although the electrodes 500 may be formed on outer sides facing each other, respectively, and may be formed at three outer sides of the bonded structure depending on the type of a final product. Alternatively, a passivation layer 300 may formed on the surface of the functional ceramic sheet 200 such that the functional ceramic sheet 200 is not exposed. This will be described later.

Referring to FIG. 5, first and second functional ceramic sheets 200 and 200a are respectively bonded to top and bottom surfaces of an insulating ceramic base 100 by diffusion bonding layers 150 and 150a. The first and second functional ceramic sheets 200 and 200a have different electric characteristics. Electrodes 500 are formed on outer sides of the bonded structure in electric connection with the first and second functional ceramic sheets 200 and 200a. Passivation layers 300 and 300a may be formed on surfaces of the first and second functional ceramic sheets 200 and 200a such that the first and second functional ceramic sheets 200 and 200a are not exposed.

With this structure, a multifunctional ceramic component can be obtained since the first and second functional ceramic sheets 200 and 200a are formed of ceramic materials having different electrical characteristics. Meanwhile, the insulating ceramic base 100 is prepared in the same way as described.

In the current embodiment shown in FIG. 5, different green sheets are used for forming the first and second functional ceramic sheets 200 and 200a. Therefore, the green sheets may be fired together to form the first and second functional ceramic sheets 200 and 200a provided that the green sheets require similar firing conditions. Otherwise, one of the green sheets requiring a higher firing temperature is fired first, and then the other is fired.

This multiple functional ceramic sheet structure is useful in manufacturing high electrostatic capacity varistors and ceramic filters. For example, when the first functional ceramic sheet 200 is formed of a (Pr based) varistor composition and the second functional sheet 200a is formed of a capacitor composition, a final product can have an electrostatic capacitance of 3 pF to 1 uF greater than 3 pF to 1 nF, an electrostatic capacitance of a single varistor. Also, when the ceramic component is configured into a three-terminal structure by changing internal electrode arrangement, a multifunctional device having an ESD function can be provided for an EMI filter.

Preferably, a via hole may be formed such that it penetrates the insulating ceramic base 100, and then the first and second functional ceramic sheets 200 and 200a may be electrically connected with each other through an electrode formed in the via hole.

In the current embodiment, the first and second functional ceramic sheets 200 and 200a are bonded to the top and bottom surfaces of the insulating ceramic base 100, respectively. However, the first and second functional ceramic sheets 200 and 200a may be sequentially bonded to the top surface of the insulating ceramic base 100, as shown in FIG. 6.

Referring to FIG. 7, a pair of internal electrodes 210 and 210a are bonded to a functional ceramic sheet 200 and electrically connected to each other. Electrodes 500 are formed on outer sides of the bonded structure in electrical connection with the internal electrodes 210 and 210a, respectively. In the current embodiment, since electrical characteristics may be measured after a firing process, an internal electrode material is formed in a strip fashion on the functional ceramic sheet 200, and then the internal electrode material is patterned using laser trimming to form the internal electrodes 210 and 210a. That is, the electrical characteristics can be adjusted through this laser trimming.

An auxiliary functional ceramic sheet having the same electrical characteristics as the functional ceramic sheet 200 may be bonded to the functional ceramic sheet 200 so as to cover the internal electrodes 210 and 210a. In this way, the electrical characteristics can be improved or expanded.

Although both internal electrodes 210 and 210a are formed on the top surface of the functional ceramic sheet 200 in the current embodiment, both electrodes 210 and 210a may be formed on the top surface of the insulating ceramic base 100. Alternatively, as shown in FIG. 8, one of the internal electrodes 210 and 210a may be formed on the top surface of the functional ceramic sheet 200 and the other may be formed on the top surface of the insulating ceramic base 100 or the bottom surface of the functional ceramic sheet 200.

The internal electrodes 210 and 210a may be formed by screen printing a predetermined pattern using paste and drying the printing pattern using hot-air. The paste may include one of precious metals such as silver (Ag)-palladium (Pd), palladium (Pd), platinum (Pt), gold (Au), and silver (Ag), or one of metals such as nickel (Ni), copper (Cu), and tungsten (W). The above-mentioned internal electrode materials do not react with most of other materials. Therefore, when the internal electrodes 210 and 210a are formed between the insulating ceramic base 100 and a green sheet, and the green sheet is fired for forming the functional ceramic sheet 200, materials may not transfer from the green sheet into the insulating ceramic base 100 by solid diffusion at portions occupied by the internal electrodes 210 and 210a. However, material transferring happens at the other portions not occupied by the internal electrodes 210 and 210a, and this material transferring extends to the portions occupied by the internal electrodes 210 and 210a to some degree, so that the functional ceramic sheet 200 can be securely bonded to the insulating ceramic base 100.

When the internal electrodes 210 and 210a are formed of paste having the same metal content of 40% to 80% as the solid content of the green sheet for the functional ceramic sheet 200, the internal electrode 210 and 210a may be fired together with the green sheet.

Further, when it is intended to form the internal electrodes 210a and 210 on the top and bottom surfaces of the functional ceramic sheet 200, the insulating ceramic base 100, the internal electrode 210, and the functional ceramic sheet 200 may be fired together. Then, the internal electrode 210a may be formed of a relatively inexpensive metal such as silver (Ag) on the top surface of the functional ceramic sheet 200 in order to reduce costs for the internal electrodes. Preferably, the internal electrode 210a may be formed of paste having a metal content of 40% to 80% through screen printing.

The above-described embodiments of the present invention have the following advantages.

The insulating ceramic base is previously prepared through a firing process, and then the green sheet is pressed on the insulating ceramic base at constant temperature and pressure, such that the green sheet can be tightly bonded to the insulating ceramic base by the binder contained in the green sheet. The pressing operation makes the thickness of the green sheet uniform and increases the density of the green sheet. After that, the green sheet is densified and converted into the functional ceramic sheet by firing, and at the same time metal oxide materials transfer from the green sheet into the pores of the insulating ceramic base by solid diffusion and chemically react with the insulating ceramic base, thereby forming the diffusion bonding layer. Owing to this diffusion bonding layer, the functional ceramic sheet can be firmly bonded to the insulating ceramic base.

Also, the previously prepared insulating ceramic base can be surface treated. For example, the surface of the insulating ceramic base may be polished to increase its roughness, or grooves may be formed to a predetermined length at predetermined intervals in the surface of the insulating ceramic base. Alternatively, the insulating ceramic base may be chemically etched using acid or plasma. After the insulating ceramic base is surface treated, the green sheet is pressed onto the insulating ceramic base and then fired. In this case, since some portions of the green sheet are pushed into the surface of the insulating ceramic base by the pressing action (anchoring structure) and then the green sheet is fired, the green sheet can be bonded to the insulating ceramic base more firmly owing to this anchoring structure. Also, this anchoring structure prevents the green sheet from shrinking in left and right directions during the firing and increases the solid diffusion by providing much more contact surface.

Furthermore, since the thin green sheet is pressed at a constant pressure and temperature, the green sheet can receive sufficient pressure increasing its, and then the green sheet is converted into the functional ceramic sheet by firing. Therefore, the thickness deviation of the functional ceramic sheet can be reduced and thus the degree of scattering of the electrical characteristics of the functional ceramic sheet can be reduced.

In addition, mechanical bending strength can be significantly increased. That is, since the insulating ceramic base is previously fired at a high temperature, sufficient mechanical strength can be obtained though the green sheet is very thin.

Moreover, manufacturing costs can be largely reduced. This is because the thin green sheet made up of expensive metal oxide materials can be used as an active layer having electrical characteristics. The raw material costs can be reduced to at least 25%, compared with the conventional chip stacking process.

A method of manufacturing a functional ceramic component will now be described according to the present invention.

FIG. 9 is a flowchart illustrating a method of manufacturing a functional ceramic component according to the present invention, and FIGS. 10A to 10I are views illustrating the method of FIG. 9.

Referring to FIG. 10A, in operation S71, an insulating ceramic base 100 fired at a constant temperature is previously prepared. A single ceramic component is mainly stated in the following description; however, in actual process, a number of ceramic components are formed from a single insulating ceramic base wafer (for example, having a size of 60×50× 0.25 mm) divided into a number of corresponding regions by scribing lines.

As describe above, the insulating ceramic base 100 may be formed of alumina or aluminum nitride. In the current embodiment, an alumina base having 96% or higher degree of purity and a thickness of 250 µm±5 µm is used.

Referring to FIG. 10B, a green sheet 202 is formed to a predetermined thickness on the insulating ceramic base 100 in operation S72.

In the current embodiment, the green sheet 202 is formed to a thickness of 10 µm to 60 µm±0.5 µm by performing a 120 to 130° C. tape casting process (hot-air drying type) on a mixture. The mixture includes: one part by weight of a compound having a zinc oxide as a main ingredient and praseodymium oxide, cobalt oxide, and neodymium oxide as additives; 0.2 to 0.4 parts by weight of a binder solution (0.1 to 0.2 parts by weight of the solid content of the binder solution); and 0.3 to 0.5 parts by weight of a solvent composed of toluene (80%) and ethanol (20%).

Generally, the lower limit of the thickness of the green sheet does not cause troubles, however, if the upper limit of the thickness of the functional ceramic sheet exceeds 60 µm, a large amount of solvent remains in the green sheet, resulting in thermal deformation during a firing process or other processes. Therefore, it is preferable that a combination of 30 µm and 40 µm green sheets is used, for example, when a 70 µm green sheet is required. In the current embodiment, a green sheet having a thickness of 37 µm±0.5 µm is used together with a green sheet having a thickness of 30 µm±0.5 µm.

After dried by hot air, the green sheet 202 may include a ceramic solid content of 40% to 80% by weight and a binder solid content of 5% to 30% by weight. The green sheet 202 may be properly formed on the insulating ceramic base 100 such that the green sheet 202 can be stuck to the insulating ceramic base 100 by isothermal, isobaric pressing (described later).

Here, if the ceramic solid content of the green sheet 202 is lower than 40%, undesired problems occur. For example, after firing, the green sheet 202 (a functional ceramic sheet 200) excessively shrinks and comes off the insulating ceramic base 100. On the other hand, if the ceramic solid content of the green sheet 202 exceeds 80%, the green sheet 200 is not tightly stuck to the insulating ceramic base 100 through isobaric and isothermal pressing since the binder solid content of the green sheet 202 is relatively low. Also, the binder solid content of the green sheet 202 is at least 5% for improving the bonding between the green sheet 202 and the insulating ceramic base 100. If the binder solid content exceeds 30%, problems such as an excessive shrinkage of the green sheet 202 would occur after firing, like in the case that the ceramic solid content of the green sheet 202 is lower than 40%.

The thickness of the functional ceramic sheet 200 is selected in consideration of the characteristics of a final product, such as mechanical strength, physical deformation by firing, and material costs. Therefore, the thickness of the green sheet 202 may be selected equal to or less than half the thickness of the insulating ceramic base 100.

Next, in operation S73, a first internal electrode 210 is formed on a top surface of the green sheet 202 having a thickness of 30 µm±0.5 µm and formed on the insulating ceramic base 100 (refer to FIG. 10C), and a green sheet 204 having a thickness of 37 µm±0.5 µm is formed on the green sheet 202 including the first internal electrode 210 for forming an active layer (refer to FIG. 10D). After that, a second internal electrode 210a corresponding to the first internal electrode 210 is formed on the green sheet 204 (refer to FIG. 10E). That is, the green sheet 204 having a thickness of 37 µm±0.5 µm is formed between the first and second internal electrodes 210 and 210a as an active layer. Then, a green sheet 206 having a thickness of 30 µm±0.5 µm is formed on the green sheet 204 including the second internal electrode 210a such that the second internal electrode 210a is not exposed (refer to FIG. 10F). The stacked structure of the green sheets 202, 204, and 206 including the first and second internal electrodes 210 and 210a has a total thickness of 103 µm±1.0 µm.

In operation S74, the insulating ceramic base 100 (in actual process, an insulating ceramic base wafer) is placed on an aluminum plate or fixture after scribing and is sealed using a vacuum forming vinyl. After that, the insulating ceramic base 100 is pressed at a constant temperature of 80° C. for three minutes at a predetermined pressure of 2200 psi and then for fifteen minutes at a constant pressure of 6000 psi.

As described above, during the isothermal and isobaric pressing, the stacked green sheets 202, 204, and 206 are densified in a thickness direction, and the binder of the green sheet 202 contacting the insulating ceramic base 100 affects the physical bonding between the green sheet 202 and the insulating ceramic base 100. Also, since the insulating ceramic base wafer for the insulating ceramic base 100 is divided by scribing lines as described above, the isothermal and isobaric pressing is performed using the aluminum plate or fixture to prevent the wafer from breaking along the scribing lines by a non-uniform force.

After the isothermal and isobaric pressing, the thickness of the stacked structure of the green sheets 202, 204, and 206 is reduced by 15% to 88 µm±0.4 µm, and the thickness deviation of the stacked structure is also reduced to ±0.4 µm, when compared with 103 µm+1.0 µm, the thickness of the stacked structure before the pressing.

In operation S75, a binder burn-out process is performed at 310° C. for 12 hours to remove organic binders from the stacked structure of the green sheets 202, 204, and 206.

Referring to FIG. 10G, a firing process is performed in operation S76. During the firing, the stacked structure of the green sheet 202, 204, and 206 is converted into a functional ceramic sheet 200 having electrical characteristics. At the same time, metal oxide materials are transferred from the green sheet 202 into pores 112 and 122 (refer to FIG. 1) of the insulating ceramic base 100 by solid diffusion caused by heat, there by forming a diffusion bonding layer 150 (refer to FIG. 1). Owing to the diffusion bonding layer 150, the functional ceramic sheet 200 can be bonded to the insulating ceramic base 100 more securely.

In the current embodiment, in consideration of the electrical characteristics of the functional ceramic sheet 200, the firing is performed at 1150° C. for 3 hours. After the firing, the thickness of the functional ceramic sheet 200 becomes uniform and reduced by 50% to 51.5 μm±0.2 μm when compared with the thickness of the stacked structure of the green sheets 202, 204, and 206. The active layer formed by the green sheet 204 has a thickness of 18.1 μm±0.1 μm. Since the stacked structure of the green sheets 202, 204, and 206 is thin, a sufficient pressing force can be uniformly applied to the stacked structure during the isothermal and isobaric pressing operation. Therefore, the green sheet 204 for the active layer and the green sheets 202 and 206 for cover layers can have good flatness, and thus the functional ceramic sheet 200 can have a uniform thickness.

The shrinking percentage of the green sheet stacked structure by the firing is about 50%. This shrinking percentage is about twice larger than 26% commonly observed in the conventional chip stacking process for ceramic components. The reason for this can be explained as follows. The green sheets are sufficiently flattened and densified by the isothermal and isobaric pressing process, and the portions of the green sheet, which are pushed into the pores 112 and 122 or other surface-treated portions of the insulating ceramic base 100, prevent the green sheets from shrinking in length (x-axis) and width (y-axis) directions. Further, the materials transferred from the green sheet into the insulating ceramic base 100 by solid diffusion may contribute to the high shrinking percentage.

Referring to FIG. 10H, in operation S77, both sides of the functional ceramic sheet 200 are removed by laser trimming in such a manner that the trimmed functional ceramic sheet 200 has a slightly larger width than the internal electrodes 210 and 210a. As a result, a surface of the insulating ceramic base 100 is partially exposed. This operation is a preliminary step for forming a passivation layer on the functional ceramic sheet 200. The passivation layer is necessary when the functional ceramic sheet 200 has semiconductor characteristics. On the other hand, when the functional ceramic sheet 200 has dielectric, piezoelectric, or magnetic characteristics, the passivation layer may be selectively omitted.

In detail, since functional ceramic sheets such as a varistor and a thermistor have semiconductor characteristics (i.e., current can flow through this semiconductor ceramic sheets), metal ions contained in electrolyte may be attached to portions of the semiconductor ceramic sheets exposed to plating environment in the following plating process for external electrodes. In this case, final products may be short-circuited, and thus electronic devices using the products may be damaged or broken. Furthermore, plating electrolyte is a strong acid solution, and thus may cause the functional ceramic sheet to corrode. Therefore, when the functional ceramic sheet 200 is a semiconductor ceramic sheet, the passivation should be formed for preventing these problems. The passivation layer is bonded to the exposed portions of the insulating ceramic base 100 so as to entirely cover the functional ceramic sheet 200.

Referring to FIG. 10I, after the laser trimming, the passivation layer is formed on the functional ceramic sheet 200 in operation S78. In detail, paste containing flexible glass particles is applied to the functional ceramic sheet 200 by screen printing and heat-treated at 700 to 800° C. The glass passivation layer may be formed to a thickness of 1 μm to 10 μm. When the glass passivation layer has a thickness smaller than 1 μm, some portions of the functional ceramic sheet 200 may not be covered with the glass passivation layer. On the other hand, when the glass passivation layer has a thickness greater than 10 μm, clumped portions or cracked portions may be present on the passivation layer due to thermal expansion during the heat treatment process or other reasons. That is, the glass passivation layer may not have a good flatness in this case.

The passivation layer 300 may be sufficiently wide not to expose the functional ceramic sheet 200 and sufficiently long to have margins spaced at least 50 μm away from both ends. This can prevent breaking failure from occurring in the following chip breaking, or prevent loose or bad contact between external electrodes and the internal electrodes 210 and 210a, after the external electrodes are formed.

The passivation layer is formed of a material having stable characteristics such as electrical insulation, chemical resistance, moisture resistance, and heat resistance. When the passivation layer is formed of a glass based material, the passivation layer may be formed by a screen printing method, a dispensing method, or the like. Alternatively, when the passivation layer is formed of a polymer, the passivation layer may be formed by vacuum thermal deposition, dipping, or the like.

After that, in operation S79, the insulating ceramic base wafer is divided into individual ceramic components by breaking it along scribing lines. In operation S80, external electrodes (not shown) are formed by a typical method.

In detail, the external electrodes can be formed by applying external electrode paste such as silver or silver-epoxy paste to both ends of the individual ceramic component through a dipping method to cover the internal electrodes 210 and 210a exposed at the both ends.

The breaking of the insulating ceramic base wafer and the forming of the external electrodes may be performed using various methods. For example, like in the chip resistor manufacturing process, the external electrodes may be formed after the insulating ceramic base wafer is primarily broken, and then the insulating ceramic base wafer may be secondly divided into individual ceramic components.

FIGS. 11 and 12 are a perspective view and a sectional view of a ceramic component manufactured through the method of FIG. 9.

Referring to FIG. 12, if necessary, nickel plating layers 510 and tin plating layers 520 may be sequentially formed on external terminals 500 through a plating process so as to allow surface mounting of the ceramic component.

Referring to Table 1 below, a ceramic component, which is manufactured using a varistor green sheet by the above-described method according to an embodiment of the present invention, is compared with first and second comparison examples. A 0.30 mm±0.05 mm ceramic component and a 0.50 mm±0.05 mm ceramic component that are manufactured by a conventional stacking method are selected for the first and second comparison examples, respectively.

TABLE 1

|  | | Embodiment of the present invention | First comparison example | Second comparison example |
|---|---|---|---|---|
| Configuration | | 1005 size 0.30 t product | 1005 size 0.30 t product | 1005 size 0.50 t product |
| Cover layer | Upper | Varistor 30 μm | Varistor 180 μm | Varistor 290 μm |
|  | Lower | Alumina base 250 μm Varistor 30 μm | Varistor 180 μm | Varistor 280 μm |
| Active layer | | Varistor 37 μm (one layer) | Varistor 35 μm (one layer) | same as left |
| Internal electrode | | 57% Pd | same as left | same as left |
| Internal electrode thickness | | 2.5 μm | same as left | same as left |
| Coating layer | | Upper glass printing | Entire polymer coating | Entire polymer coating |
| Terminal | | First external electrode | First, second external electrodes | First, second external electrodes |
| Total thickness before firing | | 0.405 mm | 0.400 mm | 0.610 mm |

Upper and lower cover layers: formed by stacking 50 μm, 40 μm, and 30 μm layers

Tables 2, 3, and 4 below show measured characteristic values of the embodiment, the first comparison example, and the second comparison example of Table 1, respectively. The characteristic values of each of the tables 2, 3, and 4 are measured from 20 chip varistor samples.

Measurement conditions are as follows.
Moisture resistance load test: 85% RH, 85° C., 5.5 Vdc, 500 hr
Electrostatic discharge test: contact discharge (±8 kV, 10 times); air discharge (±15 kV, 10 times)
Voltage rate of change: ΔVB[%]=(last value−initial value)/initial value×100

TABLE 2

|  | Thickness | | Mechanical property | Electric properties | | | Reliability properties | | |
|---|---|---|---|---|---|---|---|---|---|
|  |  |  |  |  |  |  | Moisture resistance | Contact | Air |
| Samples | Active [μm] | Final product [mm] | Bending strength [kgf] | VB [V] | IL [μA] | IR [MΩ] | load ΔVB[%] | discharge ΔVB[%] | discharge ΔVB[%] |
| 1 | 18.0 | 0.30 | 5.3 | 12.3 | 1.4 | 874 | 1.22 | 0.40 | 0.97 |
| 2 | 18.0 | 0.31 | 5.2 | 12.3 | 1.3 | 874 | 1.22 | 0.58 | 0.86 |
| 3 | 18.2 | 0.31 | 5.2 | 12.5 | 1.4 | 854 | 1.22 | 0.58 | 0.97 |
| 4 | 18.2 | 0.30 | 5.2 | 12.4 | 1.4 | 854 | 1.57 | 0.51 | 1.30 |
| 5 | 18.0 | 0.30 | 5.4 | 12.3 | 1.4 | 856 | 1.63 | 0.57 | 1.05 |
| 6 | 18.1 | 0.30 | 5.3 | 12.3 | 1.3 | 877 | 1.27 | 0.51 | 0.88 |
| 7 | 18.1 | 0.31 | 5.0 | 12.4 | 1.2 | 876 | 1.49 | 0.57 | 1.01 |
| 8 | 18.0 | 0.31 | 5.2 | 12.3 | 1.4 | 869 | 1.52 | 0.54 | 1.29 |
| 9 | 18.1 | 0.30 | 5.2 | 12.4 | 1.3 | 870 | 1.59 | 0.58 | 0.91 |
| 10 | 18.0 | 0.30 | 5.1 | 12.3 | 1.3 | 850 | 1.61 | 0.49 | 1.13 |
| 11 | 18.0 | 0.30 | 5.2 | 12.3 | 1.3 | 854 | 1.42 | 0.41 | 0.89 |
| 12 | 18.1 | 0.31 | 5.2 | 12.4 | 1.2 | 883 | 1.65 | 0.50 | 1.11 |
| 13 | 18.2 | 0.30 | 5.1 | 12.4 | 1.4 | 876 | 1.26 | 0.41 | 0.89 |
| 14 | 18.1 | 0.31 | 5.2 | 12.3 | 1.8 | 887 | 1.55 | 0.52 | 1.10 |
| 15 | 18.2 | 0.31 | 5.2 | 12.4 | 1.5 | 879 | 1.23 | 0.47 | 1.14 |
| 16 | 18.2 | 0.31 | 5.1 | 12.4 | 1.6 | 878 | 1.40 | 0.52 | 1.05 |
| 17 | 18.1 | 0.30 | 5.2 | 12.4 | 2.2 | 861 | 1.23 | 0.42 | 0.96 |
| 18 | 18.2 | 0.30 | 5.2 | 12.4 | 1.9 | 887 | 1.48 | 0.41 | 1.28 |
| 19 | 18.2 | 0.31 | 5.1 | 12.4 | 2.2 | 874 | 1.41 | 0.44 | 0.87 |
| 20 | 18.0 | 0.31 | 5.1 | 12.3 | 2.5 | 880 | 1.68 | 0.45 | 0.99 |
| Mean | 18.1 | 0.305 | 5.2 | 12.4 | 1.6 | 871 | 1.43 | 0.49 | 1.03 |
| Maximum | 18.2 | 0.310 | 5.4 | 12.5 | 2.5 | 887 | 1.68 | 0.58 | 1.30 |
| Minimum | 18.0 | 0.300 | 5.0 | 12.3 | 1.2 | 850 | 1.22 | 0.40 | 0.86 |
| Standard deviation | 0.09 | 0.005 | 0.09 | 0.06 | 0.4 | 12 | 0.17 | 0.06 | 0.14 |

TABLE 3

| Samples | Thickness | | Mechanical property | Electric properties | | | Reliability properties | | |
|---|---|---|---|---|---|---|---|---|---|
| | Active [μm] | Final product [mm] | Bending strength [kgf] | VB [V] | IL [μA] | IR [MΩ] | Moisture resistance load Δ VB[%] | Contact discharge Δ VB[%] | Air discharge Δ VB[%] |
| 1 | 18.2 | 0.32 | 1.5 | 12.4 | 2.2 | 887 | 2.00 | 0.58 | 1.49 |
| 2 | 18.5 | 0.33 | 1.5 | 12.9 | 2.5 | 906 | 1.98 | 0.50 | 1.47 |
| 3 | 18.3 | 0.31 | 1.2 | 12.5 | 2.9 | 867 | 2.11 | 0.58 | 1.47 |
| 4 | 18.4 | 0.31 | 1.2 | 12.6 | 3.2 | 852 | 1.85 | 0.53 | 1.54 |
| 5 | 18.6 | 0.31 | 1.1 | 13.0 | 2.5 | 881 | 2.05 | 0.64 | 1.47 |
| 6 | 18.3 | 0.32 | 1.4 | 12.5 | 3.3 | 873 | 1.88 | 0.53 | 1.41 |
| 7 | 18.1 | 0.33 | 1.5 | 12.4 | 3.2 | 900 | 2.04 | 0.64 | 1.54 |
| 8 | 18.0 | 0.33 | 1.5 | 12.3 | 3.8 | 908 | 1.83 | 0.62 | 1.47 |
| 9 | 18.0 | 0.32 | 1.3 | 12.3 | 2.9 | 851 | 1.83 | 0.57 | 1.51 |
| 10 | 18.3 | 0.33 | 1.8 | 12.5 | 1.5 | 886 | 2.09 | 0.64 | 1.41 |
| 11 | 18.0 | 0.31 | 1.2 | 12.3 | 3.3 | 859 | 1.91 | 0.61 | 1.42 |
| 12 | 18.5 | 0.33 | 1.4 | 12.8 | 3.6 | 880 | 2.00 | 0.59 | 1.47 |
| 13 | 18.1 | 0.31 | 1.2 | 12.4 | 3.2 | 906 | 2.01 | 0.53 | 1.43 |
| 14 | 18.1 | 0.33 | 1.8 | 12.3 | 2.7 | 893 | 1.97 | 0.62 | 1.49 |
| 15 | 18.3 | 0.33 | 1.7 | 12.5 | 3.3 | 864 | 1.99 | 0.57 | 1.47 |
| 16 | 18.7 | 0.33 | 1.7 | 13.2 | 3.2 | 898 | 2.19 | 0.52 | 1.41 |
| 17 | 18.4 | 0.31 | 1.2 | 12.6 | 2.9 | 873 | 1.98 | 0.56 | 1.54 |
| 18 | 18.1 | 0.32 | 1.5 | 12.4 | 2.4 | 893 | 1.88 | 0.54 | 1.47 |
| 19 | 18.4 | 0.31 | 1.4 | 12.6 | 2.8 | 859 | 1.99 | 0.61 | 1.45 |
| 20 | 18.3 | 0.32 | 1.4 | 12.5 | 2.89 | 881 | 1.43 | 0.49 | 1.03 |
| Mean | 18.3 | 0.321 | 1.4 | 12.6 | 2.9 | 881 | 1.95 | 0.57 | 1.45 |
| Maximum | 18.7 | 0.330 | 1.8 | 13.2 | 3.8 | 908 | 2.19 | 0.64 | 1.54 |
| Minimum | 18.0 | 0.310 | 1.1 | 12.3 | 1.5 | 851 | 1.43 | 0.49 | 1.03 |
| Standard deviation | 0.2 | 0.009 | 0.21 | 0.25 | 0.5 | 18 | 0.15 | 0.05 | 0.11 |

TABLE 4

| Samples | Thickness | | Mechanical property | Electric properties | | | Reliability properties | | |
|---|---|---|---|---|---|---|---|---|---|
| | Active [μm] | Final product [mm] | Bending strength [kgf] | VB [V] | IL [μA] | IR [MΩ] | Moisture resistance load Δ VB[%] | Contact discharge Δ VB[%] | Air discharge Δ VB[%] |
| 1 | 18.4 | 0.53 | 2.2 | 12.8 | 2.1 | 889 | 1.94 | 0.59 | 1.47 |
| 2 | 18.0 | 0.50 | 2.1 | 12.3 | 2.1 | 865 | 1.98 | 0.53 | 1.53 |
| 3 | 18.1 | 0.51 | 2.1 | 12.4 | 2.1 | 885 | 2.07 | 0.52 | 1.41 |
| 4 | 18.7 | 0.52 | 2.0 | 13.1 | 2.1 | 876 | 2.05 | 0.60 | 1.47 |
| 5 | 18.3 | 0.50 | 2.0 | 12.5 | 1.9 | 896 | 1.88 | 0.58 | 1.52 |
| 6 | 18.3 | 0.52 | 2.3 | 12.5 | 2.2 | 895 | 2.05 | 0.61 | 1.54 |
| 7 | 18.8 | 0.50 | 1.9 | 13.5 | 1.8 | 893 | 2.20 | 0.64 | 1.40 |
| 8 | 18.2 | 0.52 | 1.9 | 12.4 | 1.8 | 885 | 2.10 | 0.55 | 1.41 |
| 9 | 18.3 | 0.53 | 2.0 | 12.5 | 1.9 | 869 | 1.88 | 0.53 | 1.54 |
| 10 | 18.7 | 0.52 | 2.3 | 13.2 | 2.1 | 894 | 2.05 | 0.56 | 1.53 |
| 11 | 18.3 | 0.50 | 2.2 | 12.5 | 1.9 | 864 | 1.97 | 0.56 | 1.51 |
| 12 | 18.0 | 0.53 | 2.2 | 12.3 | 2.1 | 900 | 1.86 | 0.61 | 1.42 |
| 13 | 18.9 | 0.52 | 2.0 | 13.8 | 1.9 | 864 | 2.15 | 0.62 | 1.43 |
| 14 | 18.1 | 0.53 | 2.0 | 12.4 | 1.8 | 897 | 1.84 | 0.59 | 1.49 |
| 15 | 18.3 | 0.50 | 1.9 | 12.5 | 2.0 | 872 | 2.11 | 0.59 | 1.49 |
| 16 | 18.1 | 0.52 | 2.1 | 12.4 | 1.9 | 863 | 1.91 | 0.59 | 1.48 |
| 17 | 18.6 | 0.50 | 2.2 | 13.0 | 1.9 | 871 | 2.07 | 0.61 | 1.54 |
| 18 | 18.1 | 0.53 | 2.2 | 12.4 | 1.9 | 866 | 1.98 | 0.53 | 1.52 |
| 19 | 18.8 | 0.51 | 2.2 | 13.6 | 1.8 | 889 | 2.18 | 0.61 | 1.44 |
| 20 | 18.3 | 0.52 | 2.1 | 12.5 | 2.0 | 880 | 1.43 | 0.49 | 1.03 |
| Mean | 18.4 | 0.52 | 2.1 | 12.7 | 2.0 | 881 | 1.99 | 0.58 | 1.46 |
| Maximum | 18.9 | 0.53 | 2.3 | 13.8 | 2.2 | 900 | 2.20 | 0.64 | 1.54 |
| Minimum | 18.0 | 0.50 | 1.9 | 12.3 | 1.8 | 863 | 1.43 | 0.49 | 1.03 |
| Standard deviation | 0.28 | 0.01 | 0.13 | 0.47 | 0.1 | 13 | 0.17 | 0.04 | 0.11 |

In the embodiment of the present invention, the functional ceramic sheet (active layer) has a uniform thickness. Therefore, the ceramic component according to the embodiment of the present invention has better electric characteristics such as a VB characteristic than the first and second comparison examples.

Also, the ceramic component of the present invention is much better than the first and second comparison examples in mechanical property (bending strength). Specifically, the bending strength of the ceramic component of the present invention is at least two times higher than that of the second comparison example. This is because the insulating ceramic base of the present invention has a high mechanical strength. In the application field of electronic instruments requiring a slim and lightweight chip varistor, main concerns such as mechanical strength or breakage of ceramic parts caused by thermal shrinkage can be obviated by the use of the ceramic component of the present invention.

For example, when a chip varistor is used as an antistatic device for a small-sized chip LED (light emitting diode), the chip varistor should be thin but strong. In this case, although the first comparison example manufactured by the conventional stacking method has a acceptable thickness of 0.30 t, the first comparison example is not suitable since it may be damaged or broken by thermal or mechanical shocks during manufacturing processes of the chip LED such as epoxy molding and frame breaking processes. However, the chip varistor according to the embodiment of the present invention can be used for the small-sized LED without the above problems.

Also, the final product of the current embodiment has a smaller thickness deviation than those of the first and second comparison examples. This is because an accumulated deviation increases while a plurality of 30 μm, 40 μm, and 50 μm green sheets (functional ceramic sheets) are stacked in the first and second comparison examples.

Furthermore, a cheaper alumina base is used in the current embodiment of the present invention, such that the expensive functional ceramic material required for the functional ceramic sheet can be reduced to about ⅙ times the amount of the functional ceramic material for the corresponding 0.30 t product of the first comparison example and to about ⅒ times the amount of the functional ceramic material for the corresponding 0.50 t product of the second comparison example. Thus, manufacturing costs of the ceramic component can be significantly reduced according to the present invention. Owing to this cost-saving characteristic of the present invention, the present invention can be usefully applied to chip products requiring a large amount of functional ceramic material, such as an NTC thermistors using cobalt oxide ($Co_3O_4$) or a 4520 sized capacitor (length 4.5 mm×width 2.0 mm).

While exemplary embodiments of the present invention has been described in detail, it should be understood that various modifications can be made by those skilled in the art without departing from the spirit and scope of the invention. Possible modifications of the present invention are exemplarily explained as follows.

(1) The functional ceramic can be classified into the following categories and used for various ceramic components.

a. Dielectric ceramics: $BaTiO_3$, $SrTiO_3$, or $MgTiO_3$ based capacitor ceramic, frequency filter ceramic, antenna ceramic, etc.

b. Semiconductor ceramics: $BaTiO_3$ based PTC thermistor ceramic, NTC thermistor ceramic including at least two of $Mn_3O_4$, NiO, and $Co_3O_4$, ZnO or $SrTiO_3$ based varistor ceramic, etc.

c. Magnetic ceramics: Mn—Zn ferrite or Ni—Zn ferrite, or Mg—Zn ferrite based bead ceramic, inductor ceramic, etc.

d. Piezoelectric ceramics: $BaTiO_3$ base ceramic, $PbTiO_3$ based ceramic, etc.

(2) The internal electrodes can be disposed depending on the types of the ceramic component, such as a varistor, a bead, a thermistor, or a capacitor.

(3) When different types of functional ceramic sheets are formed on the top and bottom surfaces of the insulating ceramic base, a single ceramic component with multiple functions can be realized. In this case, the different types of functional ceramic sheets can be configured as follows.

a. High-capacitance varistor: varistor-capacitor [X7R, Y5V, Z5U]

b. ESD, EMI filter: varistor-capacitor or varistor-inductor (4) In the above-described embodiments, the plurality of green sheets is stacked on the insulating ceramic base, and the pair of internal electrodes is formed at the green sheets. However, the present invention is not limited to this configuration. For example, a single green sheet may be used for forming the functional ceramic sheet, and then the internal electrodes may be formed on the single green sheet. In this case, a ceramic component may be realized which exhibits electrical characteristics without internal electrodes.

(5) In the above-described embodiments, a polycrystalline material having pores in grains and between grains is used as the insulating ceramic base for increasing bonding strength between the functional ceramic sheet and the insulating ceramic base. However, the present invention is not limited to this. For example, a single crystalline material such as silicon or alumina can be used for the insulating ceramic base provided that the single crystalline material allows formation of a diffusion bonding layer resulted from material transfer and chemical reaction by solid diffusion.

Therefore, the scope of the invention is defined not by the detailed description of the invention but by the appended claims, and all differences within the scope will be construed as being included in the present invention.

As described above, the present invention has various advantages as follows.

An insulating ceramic base is previously prepared by firing, and a green sheet(s) is physically bonded to the insulating ceramic base through isothermal, isobaric pressing. Then, the green sheet is converted into a functional ceramic sheet by firing, and at the same time, the diffusion bonding layer is formed between the insulating ceramic base and the functional ceramic sheet since metal oxides transfer from the functional ceramic sheet into the insulating ceramic base by solid diffusion. The diffusion bonding layer increases the bonding strength between the insulating ceramic base and the functional ceramic sheet, and thus a reliable functional ceramic component can be manufactured without cracks or bending.

Also, since the functional ceramic sheet has a smaller thickness when compared with the conventional functional ceramic sheet, expensive metal oxides for the functional ceramic sheet can be saved, and thus the manufacturing costs of the ceramic component can be reduced.

Furthermore, since the insulating ceramic base is previously prepared through a high-temperature firing, the ceramic component can have a sufficient mechanical strength though the functional ceramic sheet is thin. Therefore, thin, light, and strong ceramic components can be manufactured.

Moreover, since the functional ceramic sheet has a uniform thickness and high density, the degree of scattering of electric characteristics and thickness of products can be improved, thereby increasing the yield rate.

In addition, since difference type of functional ceramic sheets can be formed on an insulating ceramic base, a multifunctional ceramic component can be manufactured.

The invention claimed is:

1. A ceramic component element comprising:
   an insulating ceramic base with pores formed on its surface and previously fired; and
   a functional ceramic sheet bonded to the insulating ceramic base and having electrical characteristics,
   wherein the functional ceramic sheet is physically bonded to the insulating ceramic base by forming and pressing a green sheet for the functional ceramic sheet on the insulating ceramic base at constant temperature and pressure so that parts of the green sheet are forced to put into the pores and anchored, and the functional ceramic sheet is chemically bonded to the insulating ceramic base by firing the anchored green sheet in such a manner that functional oxides of the green sheet penetrate the insulating ceramic base by solid diffusion to form a diffusion bonding layer.

2. The ceramic component element of claim 1, wherein the green sheet comprises 40% to 80% by weight of solid functional oxides and 5% to 30% by weight of solid binder.

3. The ceramic component element of claim 1, wherein the functional ceramic sheet has a thickness smaller than half the thickness of the insulating ceramic base.

4. The ceramic component element of claim 1, wherein the insulating ceramic base is surface treated by polishing, forming a plurality of grooves, or etching to increase a bonding strength between the insulating ceramic base and the functional ceramic sheet.

5. The ceramic component element of claim 1, wherein the functional ceramic sheet comprises any one of characteristics of a dielectric ceramic material, a piezoelectric ceramic material, a magnetic ceramic material, and a semiconductor ceramic material.

6. The ceramic component element of claim 1, wherein the insulating ceramic base comprises any one of silicon, alumina, and aluminum nitride.

7. A ceramic component comprising:
   an insulating ceramic base with pores formed on its surface and previously fired;
   a functional ceramic sheet bonded to the insulating ceramic base and having electrical characteristics; and
   two or more electrodes electrically connected to the functional ceramic sheet,
   wherein the functional ceramic sheet is physically bonded to the insulating ceramic base by forming and pressing a green sheet for the functional ceramic sheet on the insulating ceramic base at constant temperature and pressure so that parts of the green sheet are forced to put into the pores and anchored, and the functional ceramic sheet is chemically bonded to the insulating ceramic base by firing the anchored green sheet in such a manner that functional oxides of the green sheet penetrate the insulating ceramic base by solid diffusion to form a diffusion bonding layer.

8. A ceramic component comprising:
   an insulating ceramic base with pores formed on its surface and previously fired;
   a functional ceramic sheet bonded to the insulating ceramic base and having electrical characteristics;
   an internal electrode bonded to the functional ceramic sheet in electric connection with the functional ceramic sheet; and
   an external electrode electrically connected with an exposed portion of the internal electrode,
   wherein the functional ceramic sheet is physically bonded to the insulating ceramic base by forming and pressing a green sheet for the functional ceramic sheet on the insulating ceramic base at constant temperature and pressure so that parts of the green sheet are forced to put into the pores and anchored, and the functional ceramic sheet is chemically bonded to the insulating ceramic base by firing the anchored green sheet in such a manner that functional oxides of the green sheet penetrate the insulating ceramic base by solid diffusion to form a diffusion bonding layer.

9. The ceramic component of claim 8, wherein the internal electrode is bonded to a surface of the functional ceramic sheet, the ceramic component further comprising an auxiliary functional ceramic sheet bonded to the functional ceramic sheet to cover the internal electrode and having the same electrical characteristics as the functional ceramic sheet.

10. The ceramic component of claim 8, wherein the functional ceramic sheet has a stacked structure formed of a plurality of sheets.

11. The ceramic component of claim 8, wherein the internal electrode is formed of a material selected from the group consisting of Ag, Pd, Pt, Au, Ni, Cu, W, and Ag—Pd alloy.

12. A ceramic component element comprising:
    an insulating ceramic base with pores formed on its surface and previously fired;
    a first functional ceramic sheet bonded to a top surface of the insulating ceramic base and having electrical characteristics; and
    a second functional ceramic sheet bonded to a bottom surface of the insulating ceramic base and having electrical characteristics different from those of the first functional ceramic sheet,
    wherein the functional ceramic sheets are physically bonded to the top and bottom surfaces of the insulating ceramic base by forming and pressing green sheets for the first and second functional ceramic sheets on the insulating ceramic base at constant temperature and pressure so that parts of the green sheet are forced to put into the pores and anchored, and the functional ceramic sheets are chemically bonded to the top and bottom surfaces of the insulating ceramic base by firing the anchored green sheets in such a manner that functional oxides of the green sheets penetrate the insulating ceramic base by solid diffusion to form a diffusion bonding layers.

13. The ceramic component element of claim 12, wherein a via hole is formed such that it penetrates the top and bottom surfaces of the insulating ceramic base, and an electrode is formed in the via hole for electrically connecting the first and second functional ceramic sheets.

14. A ceramic component element comprising:
    an insulating ceramic base with pores formed on its surface and previously fired;
    a first functional ceramic sheet bonded to the insulating ceramic base and having electrical characteristics; and
    a second functional ceramic sheet bonded to the first functional ceramic sheet and having electrical characteristics different from those of the first functional ceramic sheet,
    wherein the first functional ceramic sheet is physically bonded to the insulating ceramic base by forming and pressing a green sheet for the first functional ceramic sheet on the insulating ceramic base at constant temperature and pressure so that parts of the green sheet are forced to put into the pores and anchored, and the first functional ceramic sheet is chemically bonded to the insulating ceramic base by firing the anchored green sheet in such a manner that functional oxides of the green sheet penetrate the insulating ceramic base by solid diffusion to form a diffusion bonding layer.

15. A method of manufacturing a ceramic component element, comprising:
    forming a green sheet on an insulating ceramic base with pores formed on its surface and previously fired;
    pressing the green sheet against the insulating ceramic base so that parts of the green sheet penetrate the pores and are anchored and are physically bonded to the insulating ceramic base;
    removing a binder from the green sheet;
    firing the green sheet under a predetermined condition; and
    converting the green sheet into a functional ceramic sheet having electrical characteristics through the firing, and at the same time chemically bonding the functional ceramic sheet to the insulating ceramic base by a diffusion bonding layer formed by solid diffusion and penetration of functional oxides from the green sheet into the insulating ceramic base during the firing of the green sheet.

16. The method of claim 15, wherein the firing of the green sheet is performed at a temperature lower than a firing temperature of the insulating ceramic base by a predetermined value.

17. A method of manufacturing a ceramic component element, comprising:
    forming a green sheet on an insulating ceramic base with pores formed on its surface and previously fired;
    pressing the green sheet against the insulating ceramic base so that parts of the green sheet penetrate the pores and are physically bonded to the insulating ceramic base;
    removing a binder from the green sheet;
    firing the green sheet under a predetermined condition;
    converting the green sheet into a functional ceramic sheet having electrical characteristics through the firing, and at the same time chemically bonding the functional ceramic sheet to the insulating ceramic base by a diffusion bonding layer formed by solid diffusion and penetration of functional oxides from the green sheet into the insulating ceramic base during the firing of the green sheet; and
    forming an external electrode electrically connected with the functional ceramic sheet.

18. The method of claim 17, wherein the green sheet is formed on a top surface of the insulating ceramic base, the method further comprising forming an internal electrode on the top surface of the insulating surface, a top surface of the green sheet, or each of top and bottom surfaces of the green sheet, wherein the external electrode is electrically connected with the internal electrode.

19. The method of claim 18, further comprising:
    trimming the functional ceramic sheet with laser to expose a surface of the insulating ceramic base, the trimmed functional ceramic sheet being wider than the internal electrode; and
    forming a passivation layer bonded to the exposed surface of insulating ceramic base and covering the internal electrode.

20. The ceramic component element of claim 1, wherein the pores are one selected from the group consisting of pores in grains, pores between grains, and pores provided by surface treatment.

* * * * *